United States Patent
Jutan et al.

(10) Patent No.: US 9,508,178 B2
(45) Date of Patent: Nov. 29, 2016

(54) FLEXIBLE 3-D CHARACTER RIGGING BLOCKS WITH INTERFACE OBLIGATIONS

(71) Applicant: LUCASFILM ENTERTAINMENT CO. LTD., San Francisco, CA (US)

(72) Inventors: Michael Justin Lee Jutan, San Francisco, CA (US); Rachel Rose, Novato, CA (US); John Doublestein, San Francisco, CA (US)

(73) Assignee: LUCASFILM ENTERTAINMENT COMPANY LTD., San Francisco, CA (US)

(*) Notice: Subject to any disclaimer, the term of this patent is extended or adjusted under 35 U.S.C. 154(b) by 545 days.

(21) Appl. No.: 13/946,823

(22) Filed: Jul. 19, 2013

(65) Prior Publication Data

US 2015/0022516 A1    Jan. 22, 2015

(51) Int. Cl.
G06T 13/40    (2011.01)

(52) U.S. Cl.
CPC .......... *G06T 13/40* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2007/0115289 A1* | 5/2007 | Goldfarb | ................. | G06T 13/40 345/473 |
| 2008/0012847 A1* | 1/2008 | Smith | ..................... | G06T 13/40 345/418 |
| 2009/0091563 A1* | 4/2009 | Viz | ......................... | G06T 13/40 345/419 |
| 2010/0123723 A1* | 5/2010 | Collard | ................... | G06T 13/40 345/473 |
| 2011/0098113 A1* | 4/2011 | Lanciault | ................ | G06T 13/20 463/32 |

FOREIGN PATENT DOCUMENTS

WO    2015/010128 A2    1/2015

OTHER PUBLICATIONS

International Search Report and Written Opinion mailed Jan. 21, 2015 for PCT/US2014/047457, 8 pages.
Cushman, Ryan, "Open Source Rigging in Blender: A Modular Approach," XP002734089, Jan. 1, 2010, pp. 1-60. Retrieved from http://tigerprints.clemson.edu/cgi/viewcontent.cgi?article=2055 &context=all_theses [retrieved on Dec. 6, 2015].
Smith et al., "dRig: An Artist-Friendly, Object-Oriented Approach to Rig Building," SIGGRAPH '12 ACM SIGGRAPH 2012 Talks, ACM, 2 Penn Plaza, Suite 701 New York, NY 10121-0701, Aug. 5, 2012, XP058008280, DOI: 10.1145/2343045.2343069, ISBN: 978-1-4503-1683-5, 1 page.
Wikipedia, "Visual Programming Language," XP002734090, Jul. 18, 2013, 7 pages. Retrieved from http://en.wikipedia.org/w/index.php?title=Visual_programming_language&oldid=564853737 [retrieved on Jan. 6, 2015].
Yuquilema, Henry, "Video KUKA SIM PRO.mp4," Accessed May 6, 2012, 1 page. Retrieved from www.youtube.com/watch?v=errfhdpCPn0.

* cited by examiner

*Primary Examiner* — Michelle Chin
(74) *Attorney, Agent, or Firm* — Kilpatrick Townsend & Stockton LLP

(57) ABSTRACT

A method of generating an animation rig for a 3-D computing environment may include accessing a plurality of blocks, each representing a particular rig element, and including interfaces that govern interactions with other rig elements and information for generating a portion of the animation rig corresponding to the particular rig element represented by the block. The method may also include receiving a selection of a first block that includes a first interface and first information and represents a first rig element, and receiving a selection of a second block that includes a second interface and second information and represents a second rig element. The method may additionally include receiving an instruction to connect the first interface to the second interface, generating the animation rig using the first information and the second information, and providing the animation rig to the 3-D computing environment.

20 Claims, 18 Drawing Sheets

FLEXIBLE 3-D CHARACTER RIGGING BLOCKS WITH INTERFACE OBLIGATIONS

CROSS-REFERENCES TO RELATED APPLICATIONS

This application is related to the commonly-assigned U.S. patent application Ser. No. 13/946,837, filed on Jul. 19, 2013, entitled "Flexible 3-D Character Rigging Development Architecture," of which the entire disclosure is hereby incorporated by reference for all purposes.

BACKGROUND

Modern computer animation often represents characters in two parts: a surface representation that visually portrays the character referred to as a skin or mesh, and a hierarchal set of interconnected members used to animate or pose the mesh. The set of interconnected members may be referred to as a skeleton or rig. Rig animation is often used to animate humanoid or animal characters, inanimate objects, machines, and/or the like; however, it can be used to control the deformation of any object within a three-dimensional scene. The set of techniques used to create a unified set of skeletal members for an object or character is often referred to as rigging a character. While rigs are designed to be manipulated by animators without an understanding of the underlying graphical transformations and complex mathematics, an understanding of these underlying complexities is required to design the rigs themselves.

BRIEF SUMMARY

In one embodiment, a method of generating an animation rig for a three-dimensional (3-D) computing environment may be presented. The method may include accessing a plurality of blocks. In some embodiments, each of the plurality of blocks may represent a particular rig element. Each of the plurality of blocks may include one or more interfaces that govern interactions with other rig elements in the 3-D computing environment, and/or information for generating a portion of the animation rig corresponding to the particular rig element represented by the block. The method may also include receiving a selection of a first block in the plurality of blocks. The first block may include a first interface and first information, the first block representing a first rig element. The method may additionally include receiving a selection of a second block in the plurality of blocks. The second block may include a second interface and second information, the second block representing a second rig element. The method may further include receiving an instruction to connect the first interface to the second interface, such that manipulating the first rig element affects the second rig element in the 3-D computing environment. The method may also include generating the animation rig using the first information and the second information, and providing the animation rig to the 3-D computing environment.

In some embodiments, the first interface and the second interface may be connected in a parent-child relationship. Manipulating the second rig element might not affect the first rig element in the 3-D computing environment. The one or more interfaces may include one or more position signposts. Each of the one or more position signposts can be assigned a value corresponding to a coordinate within the 3-D computing environment that affects the placement of the corresponding rig element within the 3-D computing environment. The one or more interfaces may include one or more handles that expose parameters of each block. The first block and the second block may be connected in a rig design environment that is distinct from the 3-D computing environment. The first block may represent a first skeletal element of a humanoid frame. The second block may represent a second skeletal element of the humanoid frame, where the first skeletal element may be physically connected to the second skeletal element in the animation rig. The one or more interfaces may include one or more attributes, where each of the one or more attributes may be assigned a value that is descriptive of the block or rig element.

In some embodiments, the method may also include accessing a plurality of templates where each template may include one or more predetermined coordinates in the 3-D computing environment, receiving a selection of a first template where the one or more predetermined coordinates of the first template can correspond to the one or more position signposts of the first block, and assigning the first template to the first block where generating the animation rig may further use the one or more predetermined coordinates of the first template to position at least a part of the animation rig in the 3-D computing environment. The method may additionally include automatically determining that the first interface is likely to be connected to the second interface, and providing one or more indications that relate the first interface to the second interface suggesting a preferred connection between the first interface and the second interface. The method may further include receiving a selection of a barnacle comprising one or more hooks where the barnacle can be configured to modify a behavior or a structure of a block by accessing the parameters exposed by the handles of the block using the one or more hooks, and receiving an instruction to connect at least one of the one or more handles of the first block to the one or more hooks of the barnacle, where the behavior or the structure of the animation rig may be generated according to the barnacle.

In another embodiment, a computer-readable memory may be presented. The computer-readable memory may comprise a sequence of instructions which, when executed by one or more processors, causes the one or more processors to generate an animation rig for a three-dimensional (3-D) computing environment. The instructions may cause the processor(s) to access a plurality of blocks. In some embodiments, each of the plurality of blocks may represent a particular rig element. Each of the plurality of blocks may include one or more interfaces that govern interactions with other rig elements in the 3-D computing environment, and information for generating a portion of the animation rig corresponding to the particular rig element represented by the block. The instructions may also cause the processor(s) to receive a selection of a first block in the plurality of blocks. The first block may include a first interface and first information, the first block representing a first rig element. The instructions may additionally cause the processor(s) to receive a selection of a second block in the plurality of blocks. The second block may include a second interface and second information, the second block representing a second rig element. The instructions may further cause the processor(s) to receive an instruction to connect the first interface to the second interface, such that manipulating the first rig element affects the second rig element in the 3-D computing environment. The instructions may also cause the processor(s) to generate the animation rig using the first information and the second information, and provide the animation rig to the 3-D computing environment.

In yet another embodiment, a system may be presented. The system may include one or more processors and a memory communicatively coupled with and readable by the one or more processors. The memory may comprise a sequence of instructions which, when executed by the one or more processors, cause the one or more processors to generate an animation rig for a three-dimensional (3-D) computing environment. The instructions may cause the processor(s) to access a plurality of blocks. In some embodiments, each of the plurality of blocks may represent a particular rig element. Each of the plurality of blocks may include one or more interfaces that govern interactions with other rig elements in the 3-D computing environment, and information for generating a portion of the animation rig corresponding to the particular rig element represented by the block. The instructions may also cause the processor(s) to receive a selection of a first block in the plurality of blocks. The first block may include a first interface and first information, the first block representing a first rig element. The instructions may additionally cause the processor(s) to receive a selection of a second block in the plurality of blocks. The second block may include a second interface and second information, the second block representing a second rig element. The instructions may further cause the processor(s) to receive an instruction to connect the first interface to the second interface, such that manipulating the first rig element affects the second rig element in the 3-D computing environment. The instructions may also cause the processor(s) to generate the animation rig using the first information and the second information, and provide the animation rig to the 3-D computing environment.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
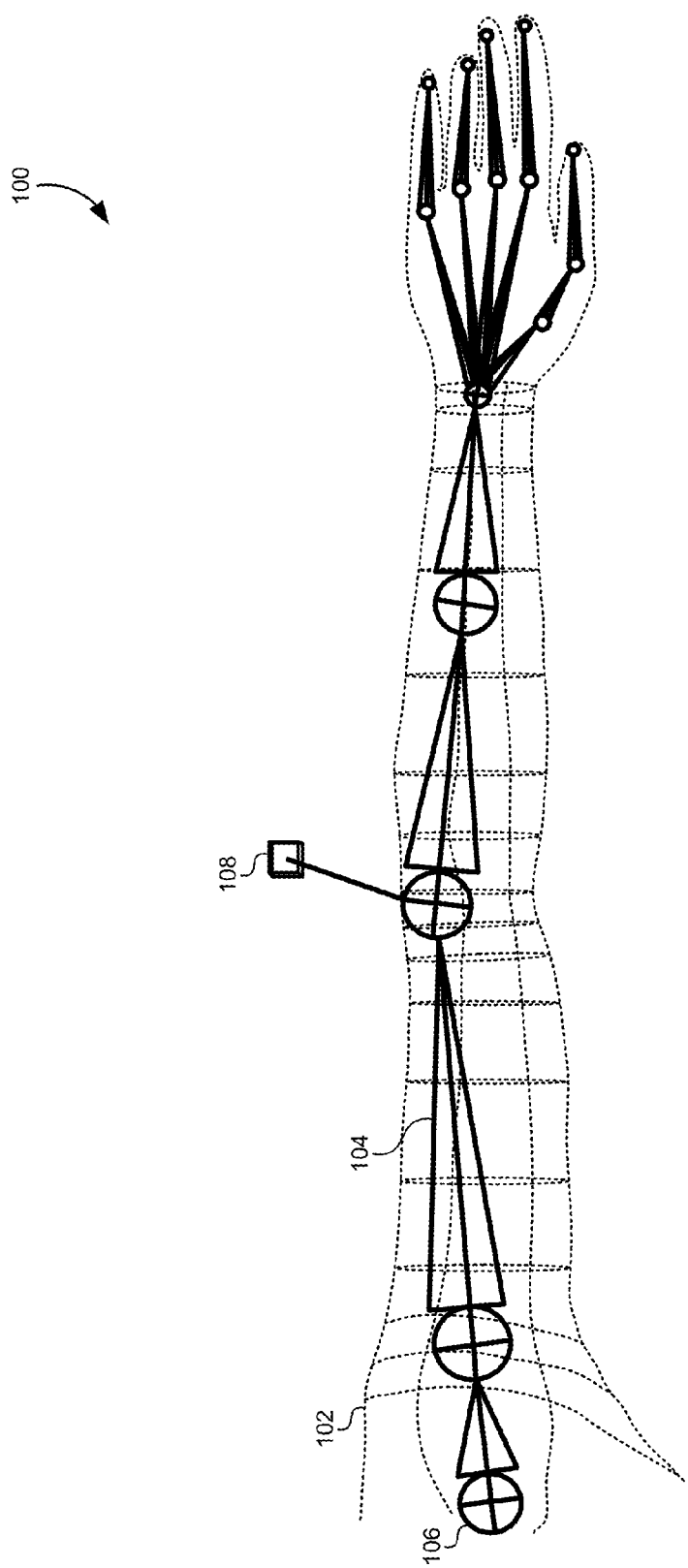
FIG. 1 illustrates an animation rig in a 3-D computing environment.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Described herein, are embodiments for designing animation rigs using simplified rig elements referred to as blocks. Blocks may accept inputs through ports, attributes, signposts, and/or handles to generate each rig element. A rig generation engine may accept a plurality of interconnected blocks to generate an animation rig for a 3-D computing environment. Also described herein are embodiments for an interface that simplifies the process of designing rigs using these blocks. Underlying complexities of the rig design may be abstracted away from a user such that blocks can be connected in a visually intuitive manner. Values may be provided through simplified interfaces, and a rig structure may be exported to the 3-D computing environment with the underlying complexities intact.

Characters and objects designed for three-dimensional (3-D) computer animations may be constructed using a number of different elements. For example, a 3-D character model may include a 3-D polygon mesh or wire mesh that defines an outer surface of the character. The mesh may be linked with surface characteristics, such as textures, surface lighting, bitmaps, color palettes, and/or the like, to generate a visible 3-D surface of a character after the rendering process is complete. However, when a 3-D designer builds a character, it can be very difficult to define and control animated motions and/or poses using only the mesh itself. In order for a 3-D animator to make the character move and interact with its environments, the 3-D mesh can be bound to a system of control handles and joints that can be used to pose the 3-D model. The system of joints and control handles may be referred to as a rig.

Conceptually, a rig may be thought of as a skeletal structure for a 3-D animated object. For example, a rig for a biped humanoid character may visually and functionally resemble a human skeleton. Animators may use control points attached to the skeletal rig to govern the movement of the character. The rigs can be coupled to points on the 3-D mesh, which can respond with fluid movements when the rig is moved. Rigs for less humanoid objects in a 3-D scene may not correspond directly with a skeletal frame, but will often still provide control points that can be manipulated by an animator as the scene progresses through time. By way of example, this disclosure may use character rigs that include essentially a digital skeleton coupled to a 3-D mesh. Like a real skeleton, the rig may be composed of joints, bones, and controls that act as "anchors" for animators to manipulate the character into a desired pose. Although many of the rigs described herein may be very simple, fully articulated rigs for feature films may require lengthy development and involve a great deal of complexity.

Digital entertainment companies may create thousands of rigs each year to support various films, television shows, and/or video games. Generally, the complexity of designing rigs may require special training in graphical arts, computer animation, and mathematics. For example, a Senior Creature Technical Director may need to conceptualize, design, develop, and/or maintain rig pieces. This artist may need to be an expert in both the artistic and aesthetic character design as well as possess a deep technical knowledge of 3-D mathematics and complex software packages used to render 3-D scenes. They also may need to manage the creation of a rig within the complex software 3-D package, a task which can often be overwhelming for technical artists. As such, rigging has become a technical artistry that has typically been limited to a select few.

In order to simplify the rigging design and maintenance process, embodiments described herein break down complex rig designs into elementary building blocks. These blocks may be reused for different rigging tasks for which they were not originally intended or anticipated by the rig designer. These expanded reuse opportunities enable the sharing of rig pieces across movies, TV shows, and/or games across an organization, or even across an entire industry. Additionally, embodiments described herein present a software interface wherein the underlying complexities of 3-D rigging can be abstracted into an accessible two-dimensional (2-D) environment. The software interface allows the art of rig design to be extended to a wider audience, including animators and artists without requiring knowledge of advanced 3-D scene graph interactions or mathematics.

In order to simplify the rigging process, rigs may be constructed from simple building block pieces referred to herein as "blocks." For example, a rig for a humanoid character may be built using blocks representing arms, legs, fingers, hands, collarbones, spines, pelvises, feet, shoulders, and/or the like. Each of these blocks can be connected together to generate the overall rig for the character.

In some embodiments, a block may be implemented as a software-based abstraction of corresponding rigs elements. The block may include code used to generate the rig elements in a 3-D scene. For example, a block representing an arm may receive inputs that describe the shape and position of the arm in the 3-D scene as well as inputs defining how the arm will interact with other rig elements and the 3-D scene environment. Using these inputs, the block code may be provided to a rig generation engine to generate a rig for the 3-D scene.

The inputs that may be provided to a block serve to make the block reusable in many different environments and for many different characters. For example, a block representing an arm may be combined with other skeletal blocks to form a rig for a human character, a cyborg character, an ape character, a stand-alone robotic arm, a damaged arm, and/or the like. Instead of requiring a new rig to be designed from scratch for each of these different character or arm types, the arm block may simply receive different inputs before the rig generation engine generates each individual rig.

Generally, blocks may be configured to receive a number of different input types. (1) Blocks may receive values for attributes that describe how the block will be used, and other descriptive information. (2) Blocks may also receive information describing locations within a 3-D scene. These locations and/or positions may define the locations of joints, controls, etc. of the resulting rig in the 3-D scene. (3) Blocks may also receive connections for defined ports. Ports may be arranged in a hierarchical plug/socket relationship, and may define connections with other blocks used to generate the rig. (4) Finally, blocks may also receive connections from what are referred to herein as "barnacles." Barnacles may be add-on blocks that alter the structure, connections, and/or behavior of the original block. Blocks and barnacles can interact through a "hook/handle" relationship where the block provides access to values and controls that can be manipulated by the barnacle.

After all of the required input values have been defined for each block to be used in the rig, the rig generation engine may process each block and use the code and inputs provided with each block to generate a rig for the 3-D scene. Therefore, instead of painstakingly defining each element of a large rig, an artist can instead simply connect blocks together in a simplified interface. The underlying complexity of generating the rig can be abstracted away from the artist, but may still be made available to advanced users who wish to alter individual blocks.

In order to further simplify the rig generation process, the simplified interface may be used to graphically abstract the underlying complex details and create an environment where connecting individual blocks to complete a rig is visually intuitive and simple. Each block may be represented using a graphical icon that is visually descriptive of the rig element represented by the block. For example, an arm may be represented by a picture of a skeletal arm. The block may also include visual port connections that can be used to graphically connect different blocks to each other. For example, an arm block may include joint and control ports that can be connected to corresponding joint and control ports on a collarbone block. An artist may then design a rig by simply dragging block icons into a design area of an interface and graphically connecting ports together in a visually intuitive way.

In some embodiments, the blocks may be visually designed to provide a minimal amount of information needed for an artist to connect blocks and generate the rig. All of the underlying complexity remains available behind the scenes, but is either hidden or abstracted away in the user interface. If users need to add barnacles, change attribute values, and/or define values for position signposts, simple interface windows may allow users to intuitively provide these inputs. Instead of seeing a complex rig with controls, joints, and connections to 3-D scene elements, rig designers only need to manipulate blocks such that they visually form a rig by virtue of their inter-block connections. Block libraries may be designed, blocks may be combined to form composite blocks for later use, and the resulting rigs may be continually edited and manipulated in the simplified interface and regenerated for the 3-D scene environment.

FIG. 1 illustrates an animation rig in a 3-D computing environment. This particular example illustrates an arm 100 of a humanoid character. The arm 100 is composed of at least two elements: a mesh 102 and a rig 104. As described above, the rig 104 may represent a skeletal system for the arm 100 that can be used to control the motion and/or position of the arm 100. The rig 104 may include joints 106 connected by rigid members that define the skeletal structure. The rig 104 may also include controls 108 that may be used by an animator to move the arm 100 without having to individually move and place each joint 106. For example, control 108 may be attached to an elbow joint of the arm 100, and may operate such that the three arm joints representing the elbow, shoulder, and wrist are coplanar with control 108.

It should be noted that the joints 106 and rigid members of the rig 104 need not always correspond to a skeletal frame of the character. Rig elements may be added to the rig 104 that are not necessarily structural in nature, but instead provide a means for moving and positioning the arm 100. In non-character rigs, such as automobiles and other machinery, rig elements may include structural members as well as controls.

The mesh 102 may be constructed using a wire mesh structure such as that shown in FIG. 1. The mesh 102 may also be constructed using a set of interconnected surface polygons (not shown). By connecting the mesh 102 to the rig 104, the animator can use the rig controls 108 to control the motion of the mesh 102. This prevents the animator from needing to manipulate individual mesh vertices that can number in the hundreds, thousands, or even millions. The mesh 102 may be conceptually linked to the rig 104 using barnacles, as will be described in greater detail herein below.

The arm 100 is displayed in FIG. 1 in a typical 3-D computer graphics software environment that allows an animator to manipulate the arm 100 in a three-dimensional setting. Autodesk® Maya is one example of a commercially available 3-D computer graphics software environment that can be used to create interactive 3-D digital media, including video games, animated films, TV series, and/or visual effects. While the 3-D computing environment may allow an animator to easily manipulate a character, it also involves a great deal of complexity when it comes to designing both the mesh and the rig for the character.

Figure 2:
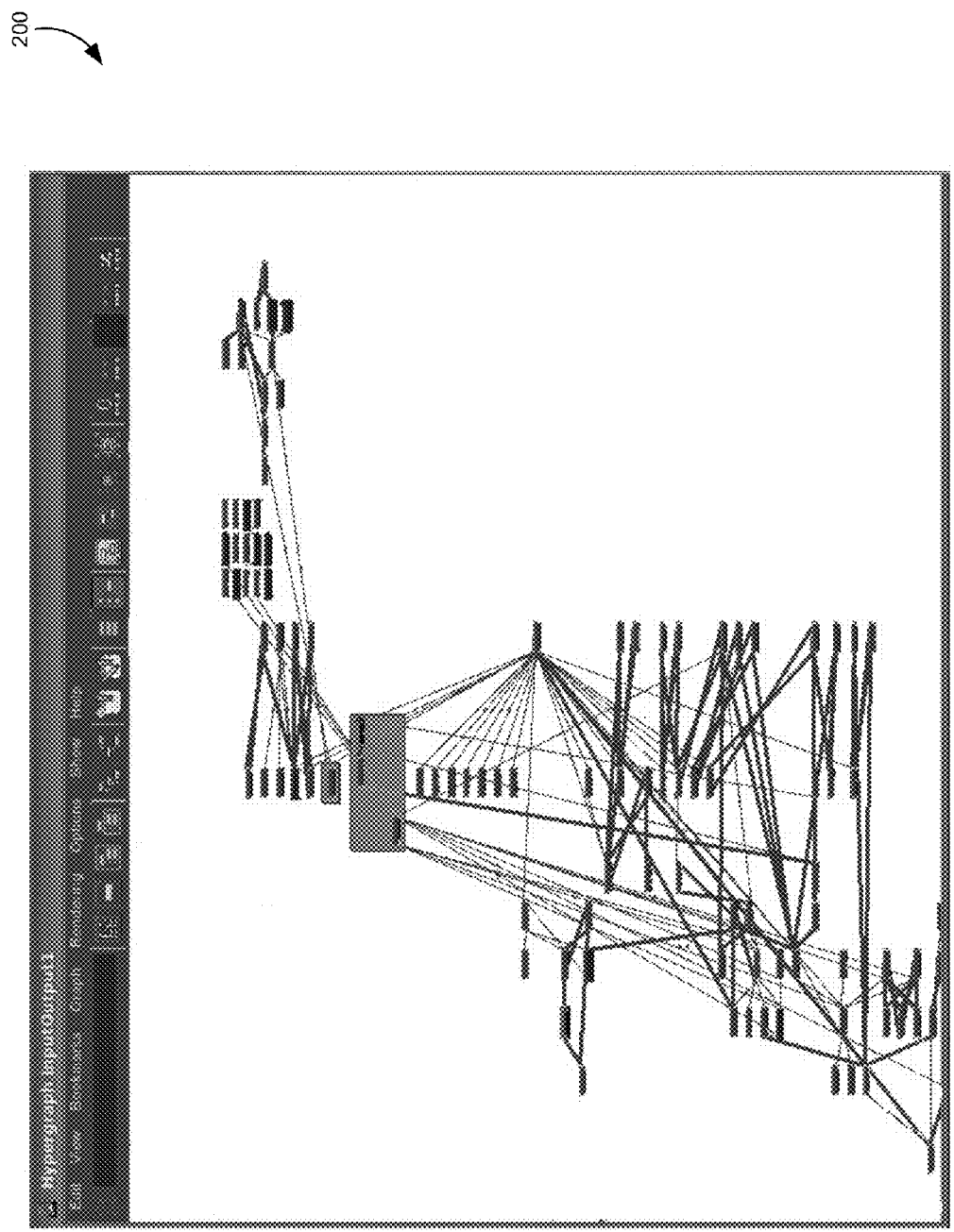
FIG. 2 illustrates a hypergraph.

In fact, as would be appreciated by one having skill in the art, the seemingly simple rig 104 for the arm 100 encapsulates a surprising amount of complexity. FIG. 2 illustrates a display known as a hypergraph 200 that defines connections, attributes, values, positions, interactions, and/or relationships between the various elements of the rig 104. At the time of this disclosure, rig designers had to work extensively in the hypergraph 200 environment in order to design and prepare the rig 104 for use by a creature animator. The hypergraph 200 includes representations of all the complex mathematical and graphical functions used to design a rig that can be manipulated in a 3-D environment. Due to the complexity of the hypergraph 200, animators, creature designers, graphical artists, and/or other animation team members were generally precluded from designing rigs for characters. The block-based system described herein, as well as the simplified user interface now make it possible for any animation team member to quickly and easily design a rig from predefined rig elements for use in a wide range of animated characters and/or objects.

Figure 3:
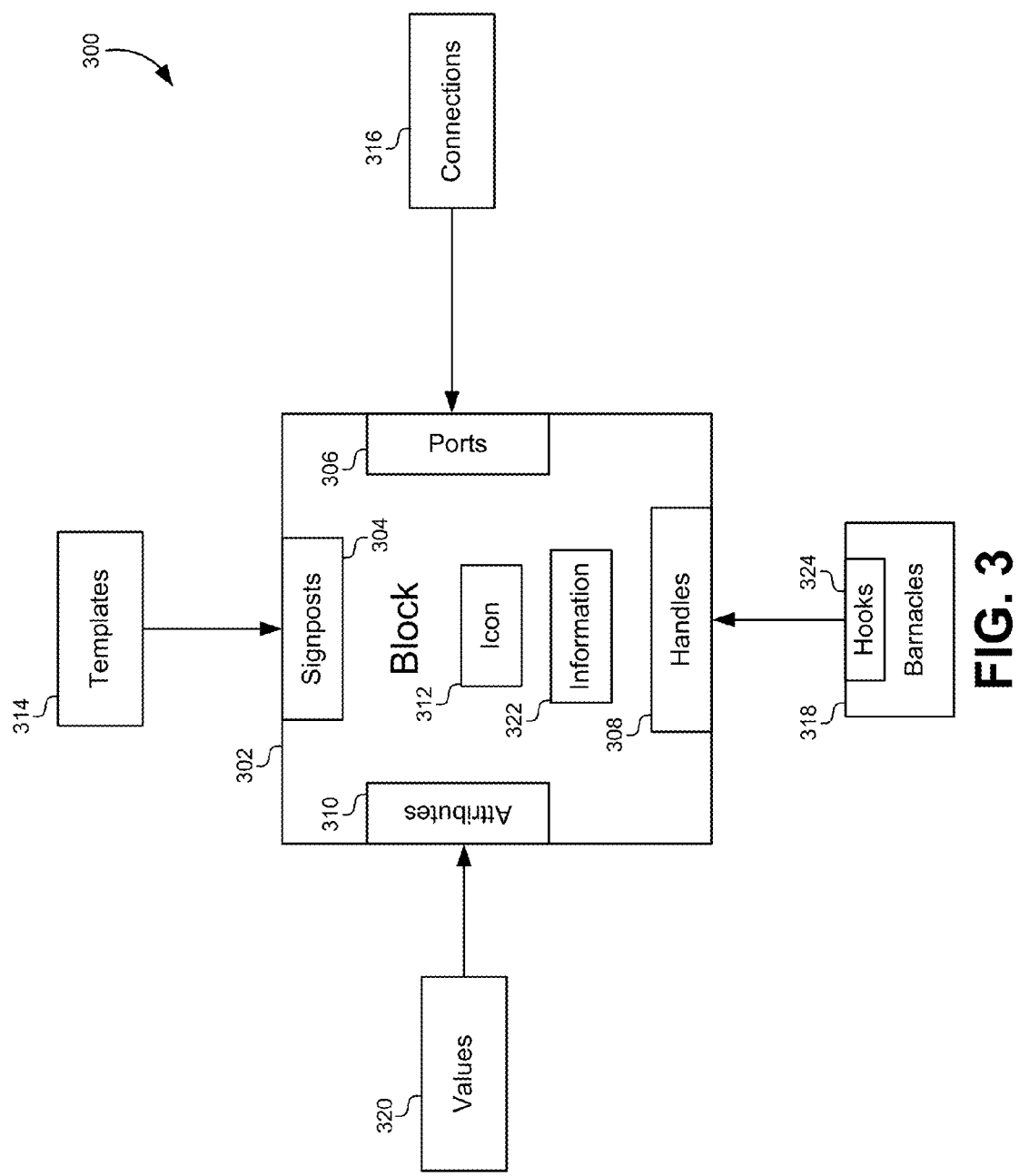
FIG. 3 illustrates a diagram of a block that can be used to generate a rig element for an animation rig, according to some embodiments.

Instead of requiring a rig designer to deal with each individual aspect of a rig as illustrated by the hypergraph 200, embodiments herein break complex rigs down into simpler rig elements that can be reused as part of a library. Rig elements may be represented by the objects referred to herein as blocks. FIG. 3 illustrates a diagram 300 of a block 302 that can be used to generate a rig element for an animation rig, according to some embodiments. As described above, a block is an object that represents a rig element. Blocks may be considered "building blocks" of complete animation rigs. Therefore the ready elements represented by blocks may typically be a smaller part of a larger rig. For example, a block may represent an arm, a hand, finger, spine, a wheel, a turret, a firearm, and/or the like. By representing these types of rig building blocks individually, the complexity of each block can be minimized while maximizing its ability to be reused across various animation rigs.

At its core, a block may include information 322 for generating a rig element. These information 322 may include interpreted or compiled code that can be executed by a rig generation engine to create a 3-D rig that can be imported into a 3-D computing environment. In some cases, the information 322 may be comprised of values, parameters, attributes, and/or the like that are used by the rig generation engine to generate the corresponding rig element. For example, the information 322 may include a list of vertices, connections, controls, positions, and/or the like that are used to generate and place a rig in a 3-D scene. The information 322 may also include software functions that manipulate existing vertices or add additional functionality according to parameters.

The information 322 may use various values to build the corresponding rig element. These data may be assigned by default when the block 302 is instantiated, and may also be overridden by data received from other blocks as well as user inputs. According to some embodiments, the types of data used by the information 322 to generate the corresponding rig element may be divided into at least four different categories: attributes 310, signposts 304, ports 306, and/or hooks 324 corresponding to handles 308. Each individual block may use one or more of these four different categories in various combinations depending upon the needs of the particular embodiment.

Each of the four different categories of data that may be supplied to the block 302 will be described in greater detail individually below in this disclosure. Briefly, attributes 310 may be assigned values 320 that describe various aspects of the block 302. Signposts 304 that position, scale, and rotate the positions of the rig element may be assigned 3-D coordinates in the 3-D scene, often times involving templates 314. Ports 306 that are used to define interactions with other rig elements may be provided with connections 316 that establish relationships with other blocks. Finally, handles 308 may expose internal data and/or functions of the block 302 that may correspond to hooks 324 in a barnacle 318 that alters the structure or behavior of the rig element.

The block 302 may also include an icon 312. The icon 312 may be implemented using a graphical representation of the corresponding rig element. For example, a block 302 representing an arm may include an icon 312 with a picture of a skeletal arm. The icon 312 may also include visual representations of the ports 306 that are available for connections to other blocks. The visual representations of the ports 306 may be colored, sized, and/or configured to be descriptive of a port type, such as an input port or an output port.

Figure 4:
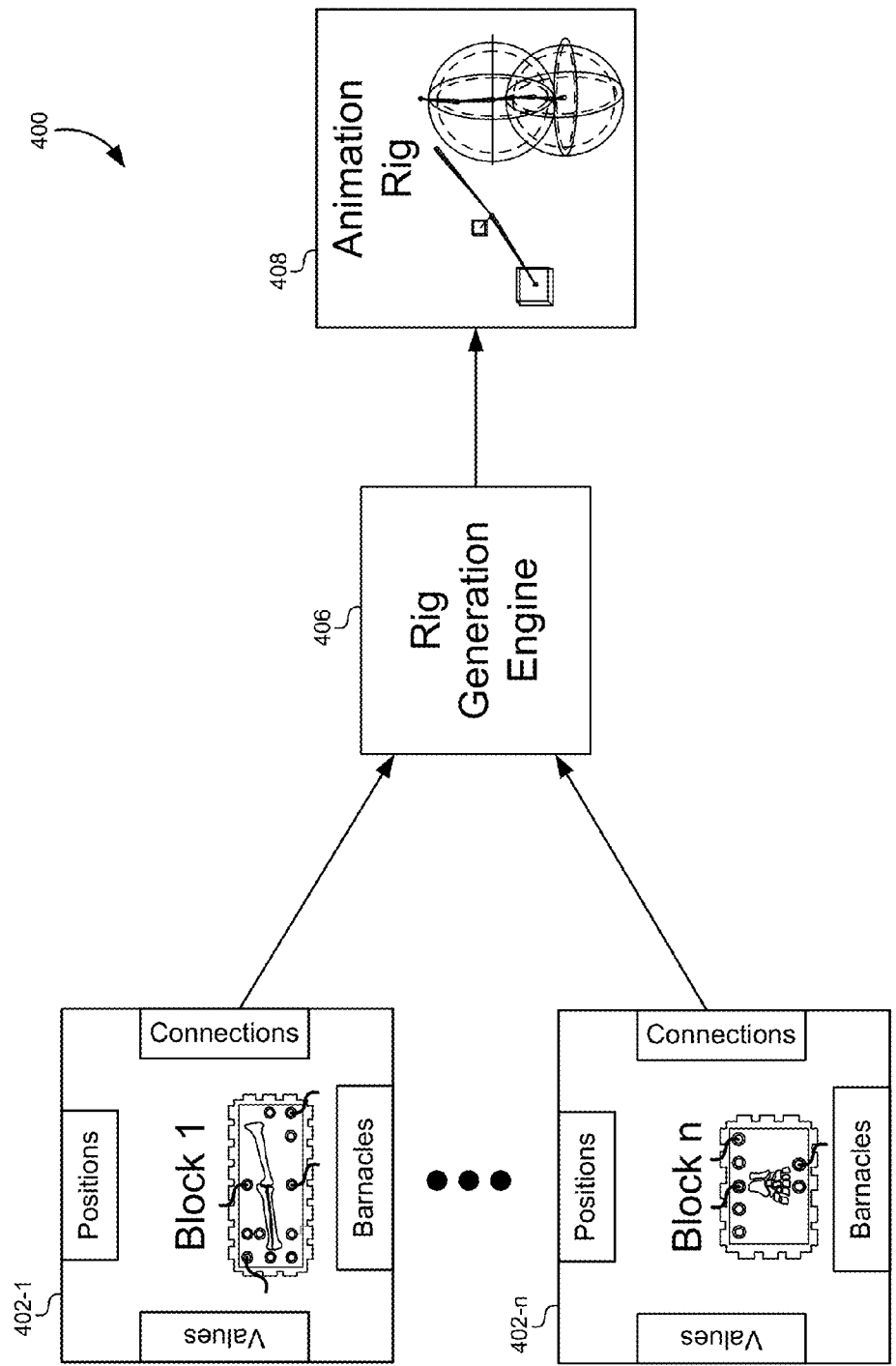
FIG. 4 illustrates a block diagram of a system for generating an animation rig, according to some embodiments.

FIG. 4 illustrates a block diagram 400 of a system for generating an animation rig, according to some embodiments. Instead of designing an animation rig from the ground up, a user may instead select blocks 402 representing rig elements. Each block 402 may be provided positions and values, either by default or by assignment. The blocks 402 may also be connected together through their respective ports, and barnacles may be added to blocks in order to alter their structure or functionality. Note that in this simplified example, block 402-1 may represent an arm as indicated by its icon, and block 402-n may represent a hand as indicated by its icon. A simplified computing environment configured to allow for the placement and connection of blocks 402 will be described hereinbelow.

A rig generation engine 406 may be provided to transform the interconnected blocks 402 into an animation rig 408. The rig generation engine 406 may be a software implementation of a routine that receives a plurality of blocks and executes code instructing a processor to generate the animation rig 408. In some embodiments, the rig generation engine 406 may be implemented using a dedicated graphics processor. The rig generation engine 406 may be a software module that is separate from a 3-D computing environment in which the animation rig 408 will be used. The rig generation engine 406 may be configured to receive blocks, provide default positions and/or values, process connections through ports, and modify blocks according to barnacles in order to generate an animation rig 408.

The animation rig 408 may include structural elements, joints, and/or controls that are manipulable in the context of a 3-D computing environment. In some embodiments, the animation rig 408 may be represented using an interconnected hyper graph of nodes similar to that of FIG. 2. The animation rig 408 may also be associated with other 3-D scene elements, such as a character mesh, other animation rigs, scene objects, vehicles, and/or the like. In some embodiments, the rig generation engine 406 may be configured to add a character mesh to the animation rig 408 as it is generated and inserted into the 3-D computing environment. For example, barnacles may define connections between the animation rig 408 and a character mesh using a barnacle such as "ENVInfluence" described below. The rig generation engine 406 may be configured to automatically import the character mesh and attach it to the animation rig 408 as it is inserted into the 3-D computing environment.

Figure 5:
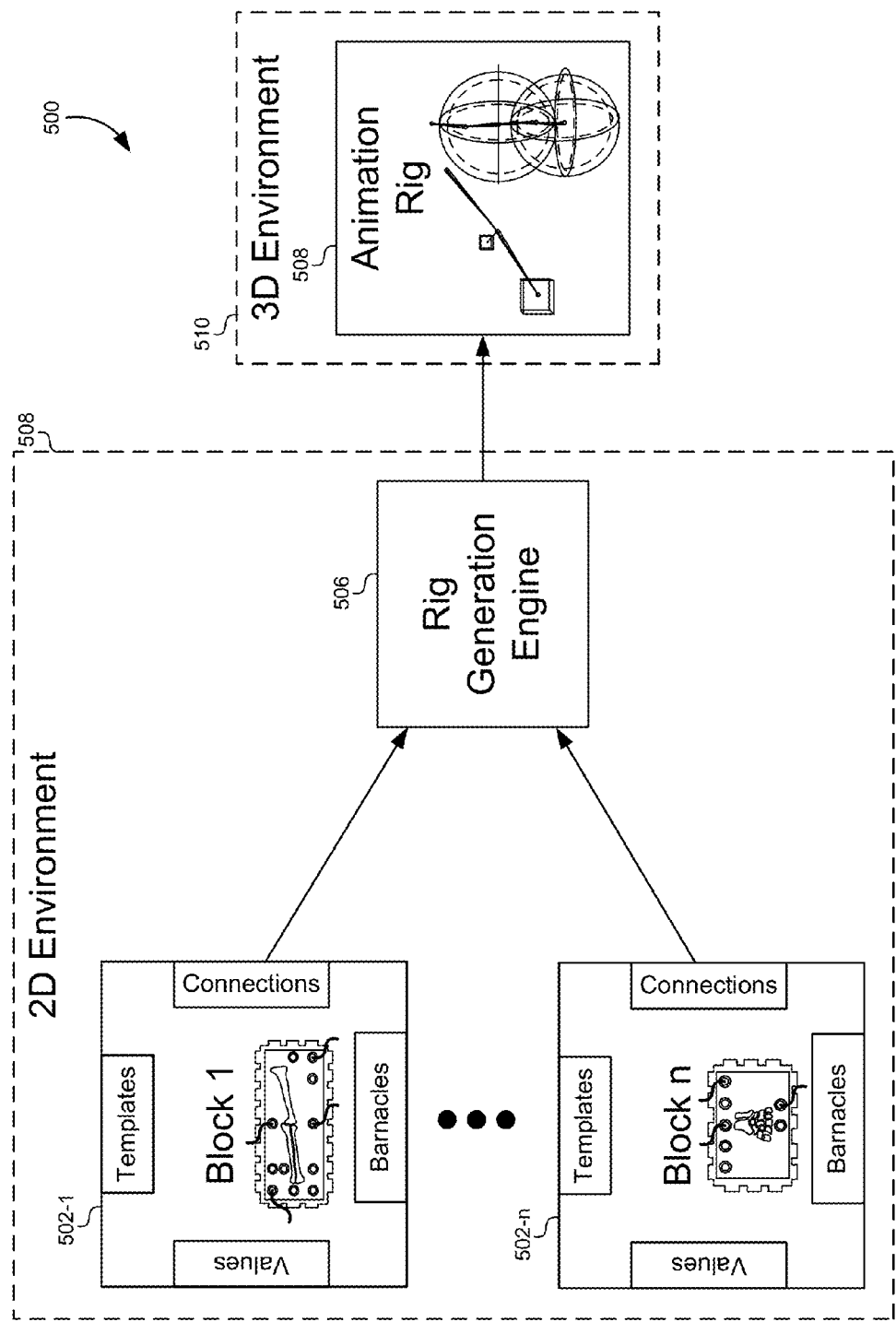
FIG. 5 illustrates a block diagram of a system for generating an animation rig using distinct environments, according to some embodiments.

FIG. 5 illustrates a block diagram 500 of a system for generating an animation rig using distinct environments, according to some embodiments. The 3-D computing environment 510 may be implemented using one of the many commercially available 3-D computer animation software packages, such as Autodesk® Maya. In contrast, a rig generation environment 508 may operate separately from and simultaneously with the 3-D computing environment 510. The rig generation environment 508 may include a workspace that allows users to instantiate and move blocks 502, to supply values and positions for attributes and signposts, to make connections between blocks 502 using ports, and/or provide barnacles for blocks 502. The rig generation environment 508 may include various user interface (UI) elements that will be described in greater detail below to manipulate, create, and store blocks and block arrangements.

In some embodiments, the rig generation environment 508 may be a two-dimensional (2-D) environment. This may significantly reduce the complexity of the rig design process. Blocks 502 may be laid out in a 2-D workspace that allows for simplified connections between blocks. For example, the icons associated with each block 502 may be presented within the rig generation interface 508. This may also allow blocks to be positioned and manipulated without having to navigate complex three-dimensional controls. Additionally, the rig generation environment 508 may significantly abstract the underlying complexity of the rig elements represented by the blocks 502 and their respective icons. In contrast, the 3-D computing environment 510 may expose all of the underlying complexity of each of the elements of the animation rig.

The rig generation engine 506 may be part of the rig generation environment 508. Controls may be provided within the rig generation environment 508 that cause the blocks 502 and connections to be provided to the rig generation engine 506 that generates the animation rig 508 in an exportable format that is understandable by the 3-D computing environment 510.

Figure 6:
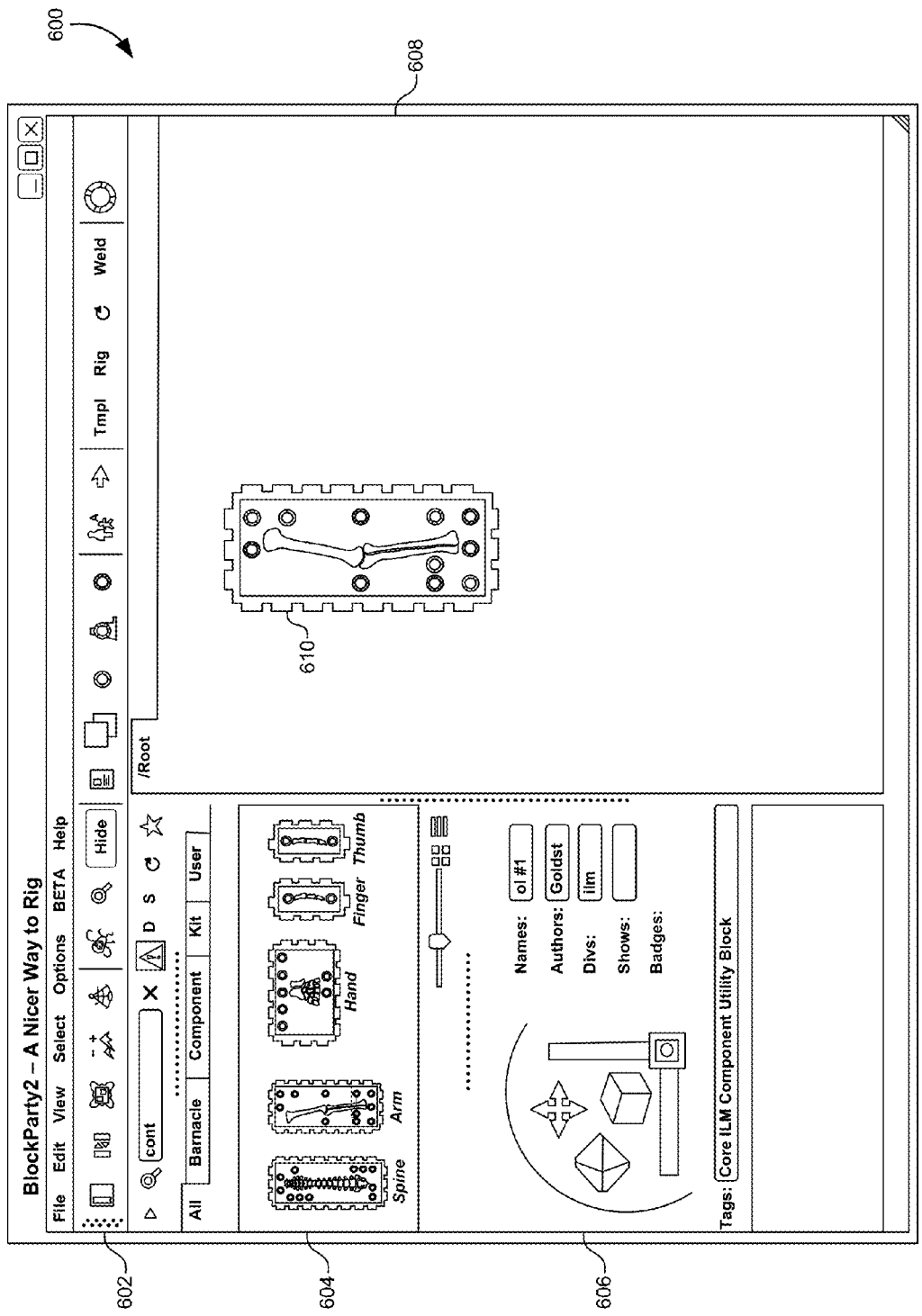
FIG. 6 illustrates an interface for a rig generation environment, according to some embodiments.

FIG. 6 illustrates an interface 600 for a rig generation environment, according to some embodiments. The interface 600 for the rig generation environment may include a library control 604 that can be used to load and/or import blocks from block libraries. In this particular example, the library control 604 displays blocks that may be used to build a humanoid character. The blocks may represent skeletal members of the humanoid, such as a spine, arm, hand, finger, and/or thumb. In order to place a block, a user may select the block in the library control 604 and drag the block into a workspace 608. Multiple instances of each block may be instantiated in the workspace 608. In one example, block 610 representing an arm may have been dragged from the library control 604 into the workspace 608. While in the workspace 608, block 610 may be moved around within the 2-D workspace by the user. The library control 604 may include tabs that allow for the display of all available blocks, or of specific blocks belonging to a particular component, kit, and/or user. The library control 604 may also include a tab allowing a user to instantiate barnacles to be attached to existing blocks.

In order to simplify the rig design process and abstract away the underlying complexities of a rig elements, block 610 may be represented with its graphical icon that conveys just enough information to the user such that the user can build a rig using the block 610. A menu 602 may be provided such that additional information may be displayed if necessary. The menu 602 may be used to generate an animation rig from the blocks, to load or define signpost templates, to add or remove connectors, edit and view interaction options, and/or many other operations described elsewhere herein.

An information pane 606 may also be displayed in the interface 600. Information displayed within the information pane 606 may correspond to a currently selected block within the library 604. In this example, block 610 (being the only selected block in the library) may be the selected block. Therefore, information pane 606 may display information associated with block 610. The information displayed may correspond to attribute values that are currently assigned to block 610. In this example, attributes such as the name of the block, the authors of the block, a company division responsible for the block, and/or other attributes may be displayed and edited using information pane 606.

It will be understood by one having skill in the art that interface 600 is merely exemplary and not meant to be limiting. Explicit descriptions of each menu item and control within interface 600 are not included in this disclosure for brevity.

Figure 7:
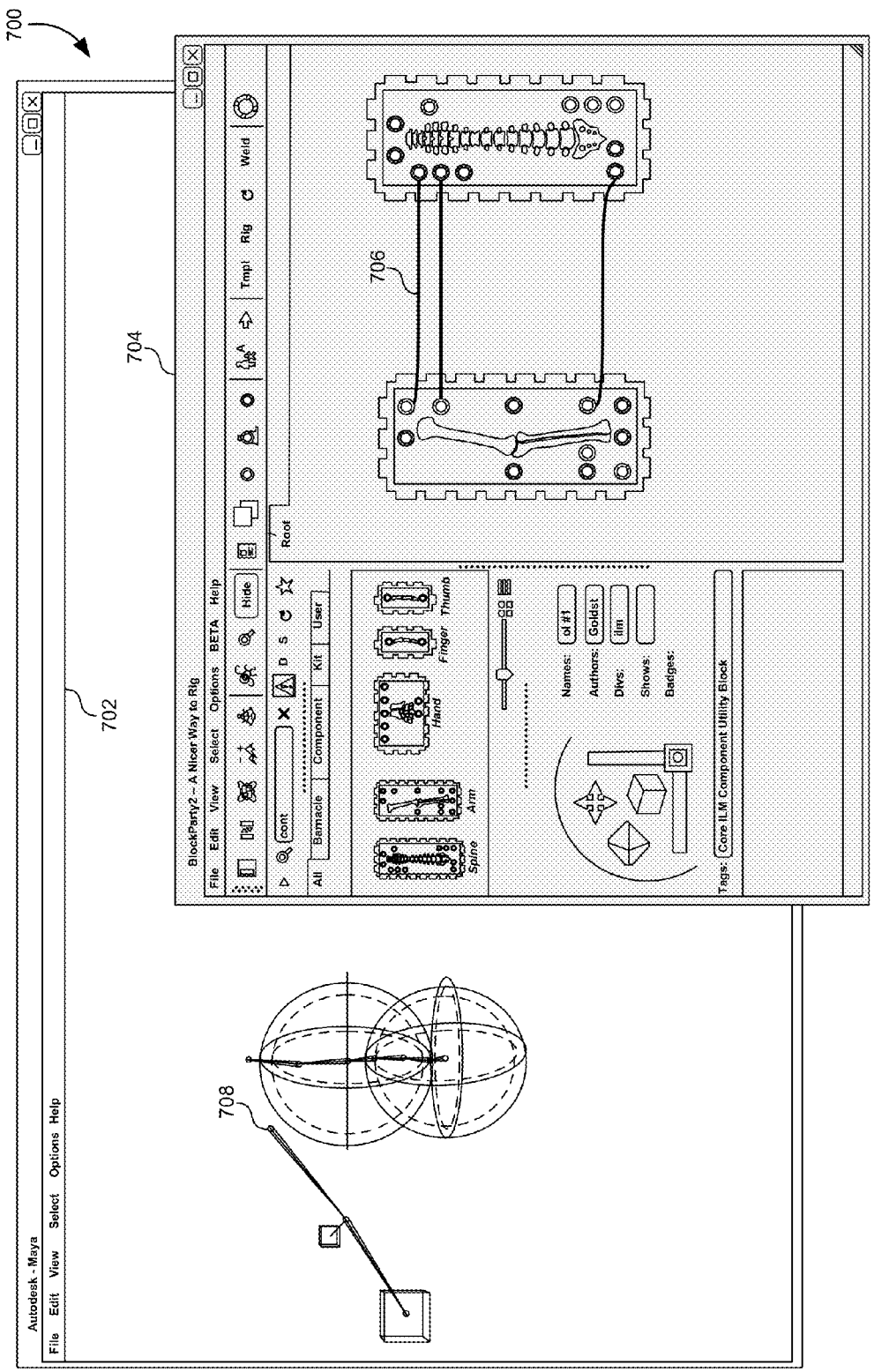
FIG. 7 illustrates a display that includes an interface for a 3-D computing environment as well as a rig generation environment, according to some embodiments.

FIG. 7 illustrates a display 700 that simultaneously includes an interface 702 for a 3-D computing environment as well as a rig generation environment 704, according to some embodiments. Display 700 may be similar to the display shown on a computer screen to a user. In many cases, the user may be working with the 3-D computing environment, such as Autodesk® Maya, to manipulate a rig 708 in three-dimensional space.

In some cases, the user may open interface 704 for the rig generation environment simultaneously with interface 702 for the 3-D computing environment. Interface 704 may sit on top of interface 702. Alternatively, a user could open interface 704, design a rig using its simplified block interface, and then import the rig 708 to interface 702 afterwards. In some embodiments, interface 704 may operate as a plug-in to the 3-D computing environment of interface 702.

When both interface 702 and interface 704 are operating simultaneously, a user may make changes to a rig design 706 using blocks, and then immediately see those changes reflected by the rig 708 in the 3-D display of interface 702. In some embodiments, changes made to the rig 708 in the more complicated setting of 3D interface 702 may also be imported and reflected in the 2D interface 704. The simultaneous display allows a user to design complicated blocks using a simplified interface while being able to immediately see the complicated rig design as it will be used in the actual animation process.

One advantageous feature of the simplified rig generation environment disclosed herein is the idea of contractual obligations between blocks. As used herein, the term "contractual obligation" may be used to refer generically to an exposed interface, or set of requirements, advertised by each block that may be required in order to properly generate a rig element based on the block. Contractual obligations may include position signposts, plug-and-socket ports, attributes, and/or hooks/handles associated with barnacles. In some embodiments, a contractual obligation may be compared to a software interface wherein values or functions associated with the block are exposed to other elements of the 3-D environment. By fulfilling the contractual obligations of a block, a user may specify the position of the associated rig element in the 3-D environment, the position of the associated rig element in relation to other rig elements, additional structures and/or behaviors of the rig element, and behaviors of the rig element that are influenced by behaviors of other rig elements.

Figure 8:
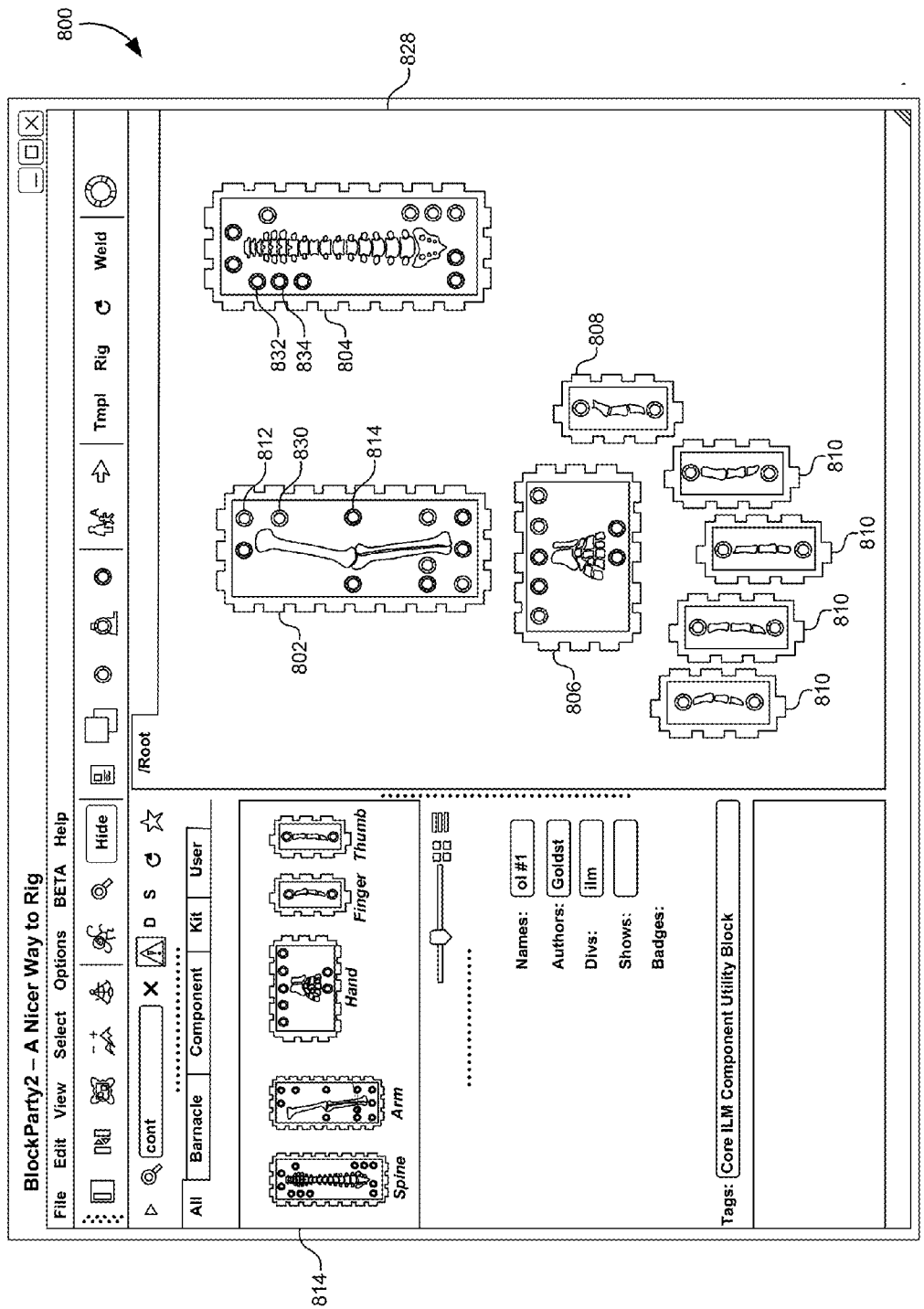
FIG. 8 illustrates an interface for using ports to connect blocks, according to some embodiments.

FIG. 8 illustrates an interface 800 for using ports to connect blocks, according to some embodiments. A workspace 828 of interface 800 has instances of blocks 802, 804, 806, 808, and 810 that may be used to generate an arm attached to a spine. Each of blocks 802, 804, 806, 808, and 810 may have been dragged from the library 814 to the workspace 828. Note that multiple instances of a single block type may be instantiated within the workspace 828. For example, four instances of block 810 representing a finger are currently instantiated. In some embodiments, each finger block may be distinct (i.e., ring finger, pointer finger, pinky, etc.), while in other embodiments the same figure block may be used with different attributes, signposts, and port relationships that distinguish one finger from another.

Each block may be associated with one or more ports. In the rig generation environment, each port may be represented by a graphical icon, such as the rings representing ports 812 and 814 in block 802. In some embodiments, ports may be categorized as inputs or outputs. These may be referred to as plugs and sockets. Plugs and sockets may form a hierarchical arrangement of blocks. In some embodiments, plugs and sockets may form a parent/child relationship, where blocks with sockets representing a parent are connected to blocks with plugs representing children. Different types of ports may be distinguished visually based on the graphic icon. For example, sockets may be colored a first color, such as blue, while plugs may be colored a second color, such as red. In other embodiments, plugs may be represented by a first icon that is visibly and readily associated with an input, while sockets may be represented by a second icon that is visibly and readily associated with an output. In the example of interface 800, block 802 includes six sockets and five plugs. The sockets, such as port 814, may be represented as rings having a darker color. The plugs, such as port 812, may be represented as rings having a lighter color.

In order to simplify the process of connecting plugs and sockets together to form a skeletal rig, ports may be graphically represented in locations that suggest connections with other blocks. For example, port 812 and port 830 are both located relative to the upper end of the arm bone graphic of block 802. Thus, ports may be located relative to a physical and/or conceptual connection on the icon. The location of port 812 may suggest to the user that port 812 may be used to position and/or control the arm as a shoulder joint. The location of port 812 may also help the user connect to a corresponding socket on the spine of block 804. Therefore, each port icon may be positioned relative to a rig element icon such that it suggests both connections that should be made as well as resulting functionalities.

In addition to characterizing ports as inputs/outputs or plugs/sockets, some ports may also be characterized by function. In some embodiments, ports may be associated with physical, skeletal connections between rig elements, as well as how these connections influence the motion of the rig elements. For example, port 812 may be representative of a physical connection between the humorous of the bone of the arm of block 802 and a shoulder joint of the spine of block 804. In some embodiments (not shown), a port representing a physical connection may be distinguished graphically with an icon that is different from ports that represent a control connection. In some embodiments, a port represent a physical connection may be distinguished by its name. For example, port 812 may be named "FKShoulder" where the "FK" prefix denotes a physical connection. Thus, by selecting port 812, interface 800 could present the name (FKShoulder) such that it is visible to the user and can be used to designate port 812 as a physical connection. It should be noted that other skeletal elements, such as a colarbone, have been omitted from this description for brevity.

Instead of being used to designate a physical connection, a port may also designate a control connection. This parent/child relationship may provide an intuitive way for the motion and position of a parent rig element to affect the motion and position of a child rig element. For example, when an animator moves the spine element represented by block 804, it would be expected that the arm element represented by block 802 would move in a corresponding fashion. Port 830 may be designated as a control connection. A port representing a control connection may be distinguished graphically with an icon is different from ports representing a physical connection. In some embodiments, a port representing a control connection may be distinguished by its name. For example, port 830 may be named "IKChestCon" where the "IK" prefix denotes a control connection.

In some embodiments, the process of making a simple connection between the spine of block 804 and the arm of block 802 may include connecting both a physical connection port as well as a control connection port. For example, port 812 could be connected to port 832, and port 830 could be connected to port 834. These two connections may establish both a physical connection between the spine and the arm as well as a control connection such that the arm moves with the spine.

Figure 9:
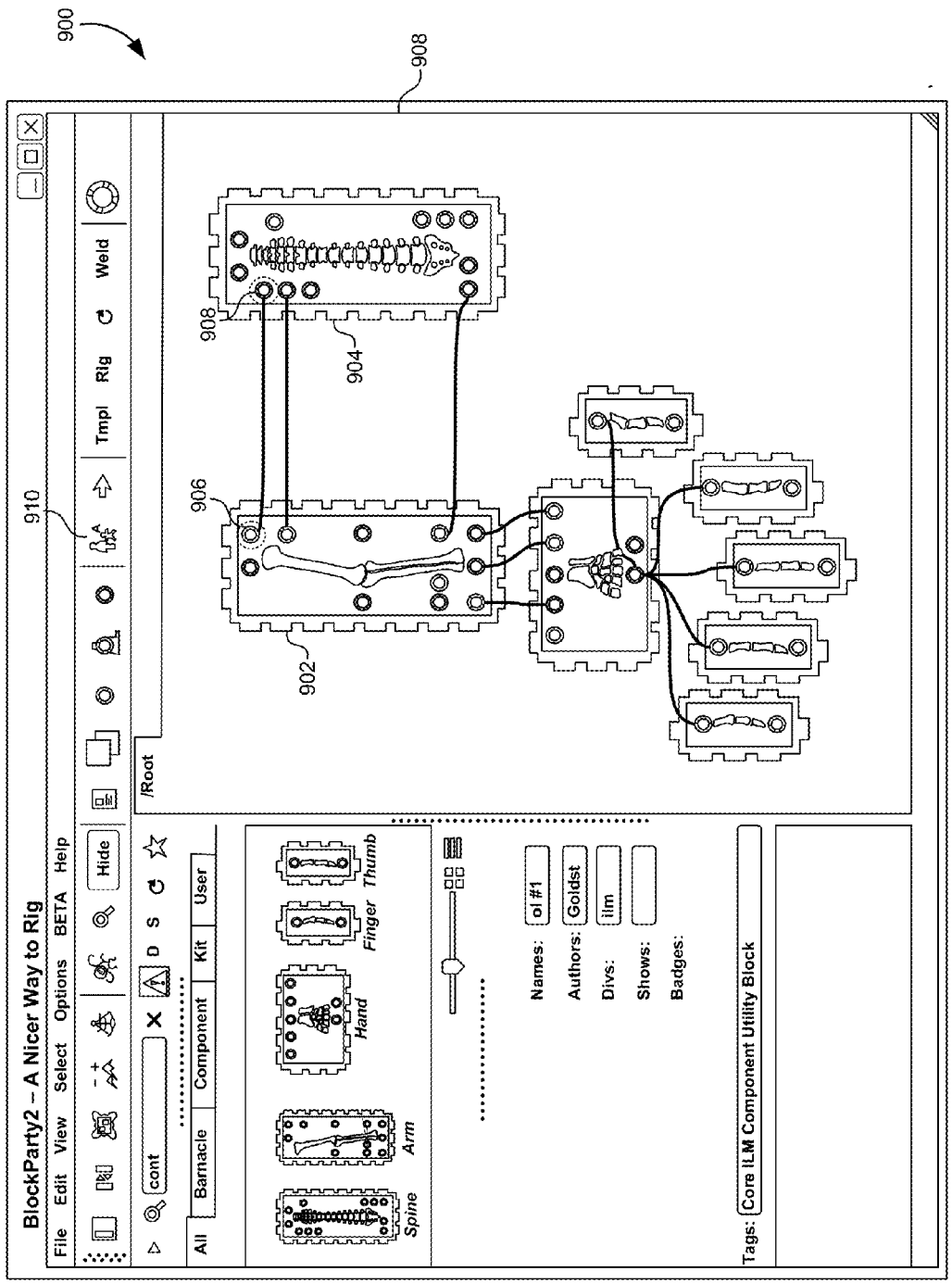
FIG. 9 illustrates an interface for making connections between blocks, according to some embodiments.

FIG. 9 illustrates an interface 900 for making connections between blocks, according to some embodiments. A workspace 908 of interface 900 includes blocks similar to those of interface 800, including block 902 representing an arm and a block 904 representing a spine. In workspace 908, connections have been established between various blocks in order to interconnect the rig elements and to form the overall animation rig for use in the 3-D environment.

In some embodiments, connections may be established graphically by using an input device to connect a plug to a corresponding port. A graphical line may be drawn between the ports within workspace 908 in order to visually connect the ports. In some embodiments, connections may also be established textually using a command line input. It should be noted that multiple plugs can be connected to a single socket.

In order to simplify the connection process, some blocks may be connected using the concept of "friend" connections. In addition to positioning ports in locations that suggest desirable connections, the graphical rig generation environment may also visually suggest connections between ports on nearby blocks. For example, a user may select port 906. In response, the rig generation environment may visually highlight any ports on nearby blocks that are configured to accept a connection to port 906 of block 902. In this case, the physical shoulder connection of port 906 corresponds to the physical shoulder connection of port 908 of block 904. Therefore, the rig generation environment may visually highlight port 908, suggesting to the user a connection between port 906 and port 908. Friend connections may be automatically suggested upon selecting a port. In some cases, multiple friend connections may exist, and the user may then select between highlighted ports of the available friend connections.

In some embodiments, friend connections may be suggested by the rig generation interface before ports are even selected. A friend connection control 910 may be made available in a menu of interface 900 such that when activated by the user, a plurality of friend connections are suggested between blocks in the workspace 908. For example, by selecting friend connection control 910, the rig generation environment may automatically highlight port 906 and port 908, suggesting a connection between these ports. In some embodiments, a user may select a block, such as block 902, then select the friend connection control 910, which would then highlight all friend connections associated with the ports of block 902. In other embodiments, selecting the friend connection control 910 may automatically connect all friend ports to each other without any additional user inputs. It should be noted that friend connections are merely suggestions; any plug it can be connected to any other socket regardless of friends status.

Friend connections may be determined by analyzing the structure of the various rig elements. For example, the rig generation environment may automatically determine that the shoulder of an arm should connect to a shoulder of a torso or spine. In other embodiments, friend connections may be established by analyzing the names given to various ports. The base name, excluding any prefix or suffix, may be compared and matched. For example, the shoulder of the arm and the shoulder of the spine may both include the base name "Shoulder" with additional prefixes and/or suffixes, which may be disregarded. Thus, when naming ports, a designer may be advised to use names that are descriptive and follow a standardized naming convention according to business rules of an associated animation division.

When the rig generation environment generates a 3-D rig from the interconnected blocks in the workspace 908, the abstract connections between blocks may be synthesized by the rig generation code to create the complex hypergraph of physical connections and functional relationships illustrated in FIG. 2. Thus interface 900 presents only the external connections between blocks that are necessary for designing the rig from blocks. All of the underlying complexity has been abstracted away by the rig generation environment. This allows users to grab graphical blocks from the library, make connections suggested by the friend function of the rig generation environment, and then generate a resulting 3-D rig that is exported into the 3-D computing environment. Thus users are able to use these rig building blocks to design very complicated rig structures that would otherwise require the skills of specially trained rig designers.

Figure 10:
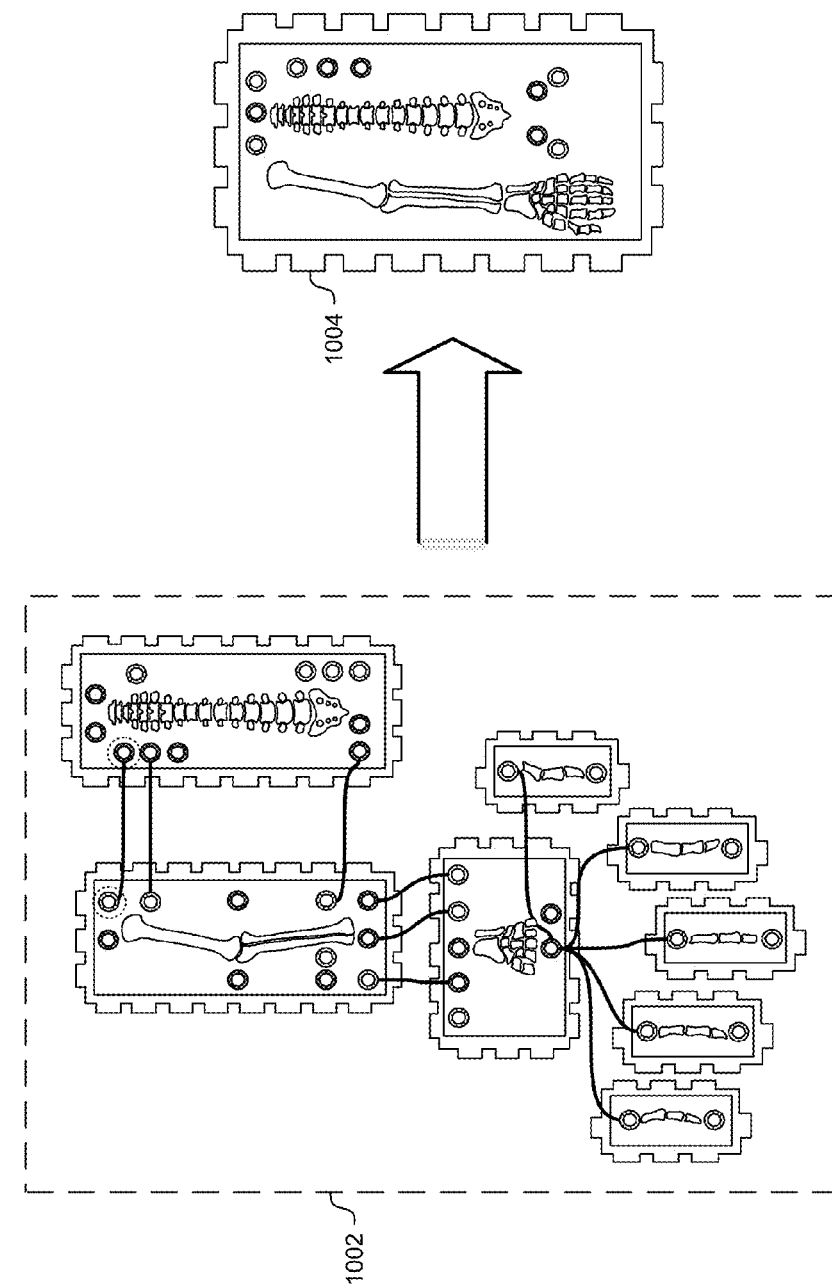
FIG. 10 illustrates an interface for creating new blocks from existing blocks, according to some embodiments.

FIG. 10 illustrates an interface 1000 for creating new blocks from existing blocks, according to some embodiments. In some cases, users may find that certain block configurations may be reused time and time again. The simplified rig generation environment allows users to select a group of interconnected blocks 1002 and create a new composite block 1004 that may be used in other projects. The composite block 1004 may be stored in a library, instantiated in workspace, connected to other blocks or composite blocks, and/or may be involved in any of the other operations that a normal block may be involved with.

To create a composite block 1004, a user may first instantiate a number of existing blocks. The existing blocks may be block primitives that were designed by a block designer, or may include composite blocks that are comprised of multiple primitive and/or other composite blocks.

The user may then establish connections between the blocks to be joined together to form the composite block. After the internal connections of all been made between the existing blocks, a user may select the interconnected blocks 1002 and instruct the rig generation environment to create the new composite block 1004. The new composite block may combine the code of each individual block such that the code of the composite block will generate a rig element representing the interconnections between the individual blocks.

Creating composite blocks may allow users to further abstract away complexities that are not necessary for block design. Note that the new composite block abstracts away the internal connections between the blocks that are used to generate the rig elements. Instead, only the external connections that remain to be fulfilled are represented in the composite block 1004. For example, connections between the arm, hand, fingers, and thumb are not displayed in the composite block 1004. Instead, only ports representing connections to other rig elements that are not part of the composite block 1004 are represented, such as connections to a neck/head, another arm, legs/hips, etc.

In order to generate a composite block 1004 that is representative of the individual blocks and visually intuitive for novice rig designers, the process for generating the composite block 1004 may include allowing the user to rearrange existing icons to form a composite icon. In this example, the rig generation environment may allow a user to select the arm bones, spine, hand bones, and finger/thumb bones and reposition them to form the icon of composite block 1004. Additionally, the rig generation environment may automatically remove internal connections and ports that should not be exposed by the composite block 1004. Existing ports may be positioned automatically or by the user such that their positioning represents physical connections to the composite block 1004. Additionally, the ports of the composite block 1004 can be authored to further reduce or customize the visibility of ports, graphics, and/or the like associated with the composite block 1004.

Figure 11:
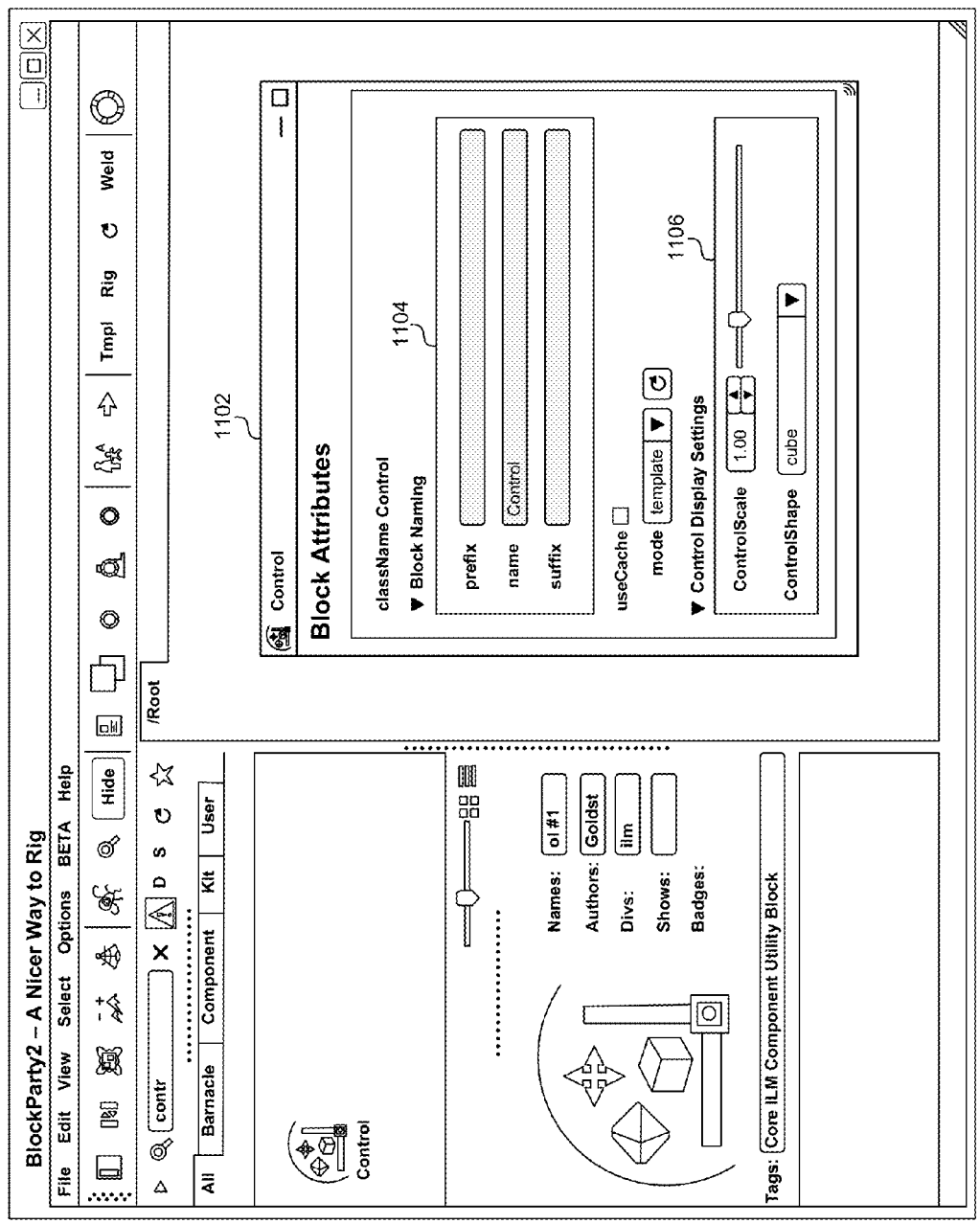
FIG. 11 illustrates an interface for assigning block attributes, according to some embodiments.

FIG. 11 illustrates an interface 1100 for assigning block attributes, according to some embodiments. As described above, block attributes may include descriptive information of the block. In some cases, block attributes may be a required field for instantiating a block or creating a rig element from a block. In some cases, some attributes may be left blank. In some embodiments, all attributes may be optional. What follows is a description of some exemplary attributes that may relate a particular block referred to as a control. The control may be considered one of the fundamental units of a 3-D rig, and may represent a single point in 3-D space having a position, scale, and/or rotation. One practical use for controls may be assigning them to signpost positions of a block.

The rig generation environment of interface 1100 may provide an intuitive attribute window 1102 that allows the user to view and/or modify block attributes. In this embodiment, attributes may be subdivided into three general categories. The first category 1104 may deal with descriptive information of the block, such as a block name. The block name may include a prefix, such as "FK" or "IK" that were earlier described in relation to ports. The block name may also include a base name, such as "Control," that describes a function, behavior or form of the block. In some cases, the block name may also include a suffix. In some embodiments, the suffix may be used to force uniqueness of block names in a large system. The suffix and/or prefix may be used to define a class of block, and may be used to coordinate elements between blocks and throughout a block library.

The second category of attributes may include settings for controlling how a block is used. For example, attribute window 1102 includes an input for determining whether a cached version of the block should be used, or whether a new version should be retrieved from memory with each instance. A control is also available to switch between template mode and a rig generation mode.

The third category 1106 of attributes may include settings for how a block is displayed and/or generated within the rig generation environment. For example, a control scale may increase or decrease the size of the block icon in relation to other blocks. Some blocks may also include multiple graphical icons that are visually descriptive of the associated rig element. A drop-down box may allow user to select from among a plurality of available graphical icons to match the particular type of rig. For example, an arm rig may include arm icons that depict a robotic arm, a skeletal arm, a damaged arm, and/or the like. While the underlying rig structure remains the same, the graphical icon may be used to further enhance the rig generation experience and closer approximate the final rig product with an associated mesh or wireframe. Furthermore, options may also exist that affect how the rig generation engine procedurally generates the block as they are passed as inputs to the procedural generation code.

Figure 12:
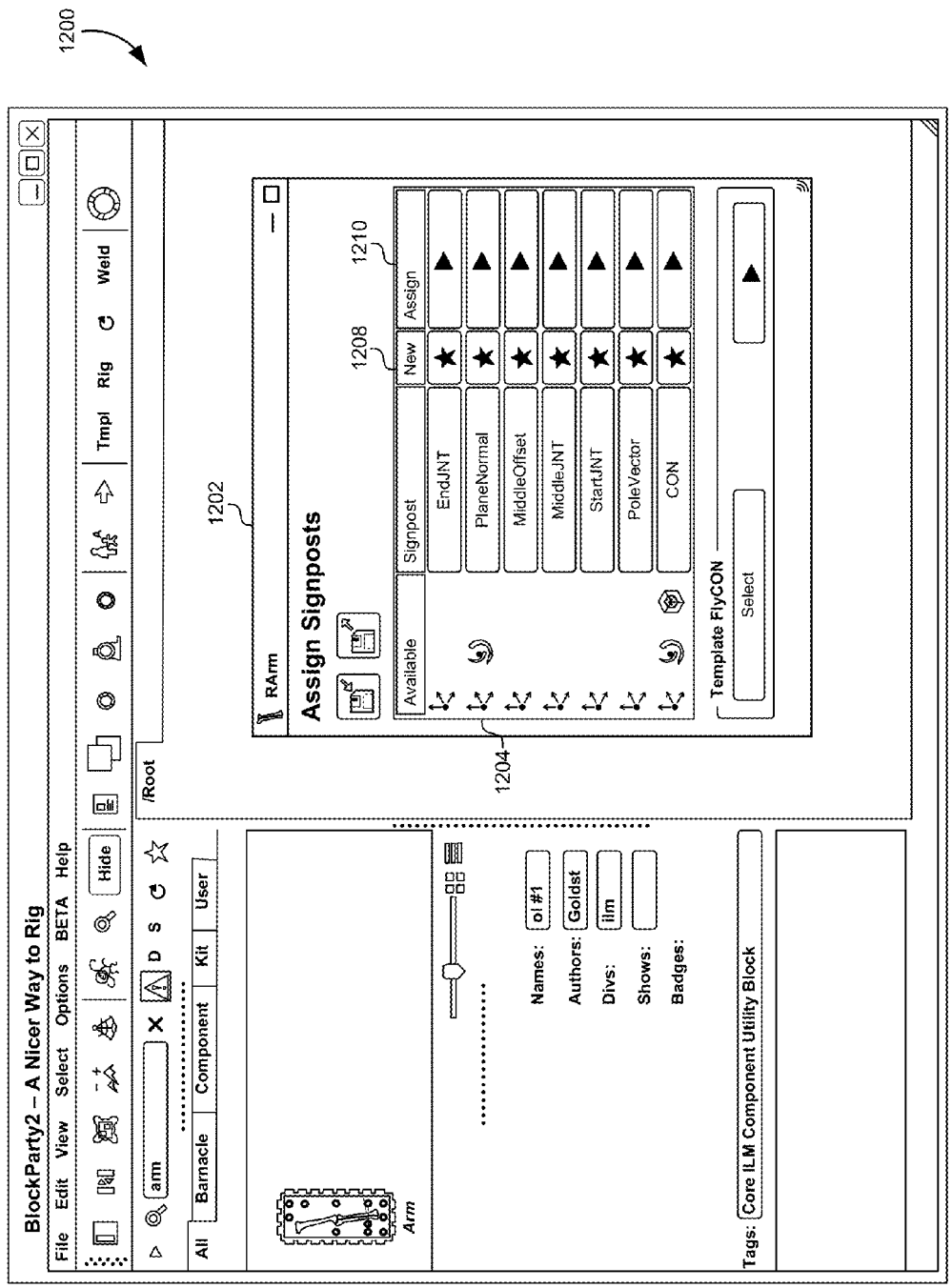
FIG. 12 illustrates an interface for assigning coordinates to signposts, according to some embodiments.

In addition to attributes and ports, a third type of contractual obligation or input that may be provided for library blocks may include position signposts. When a block is instantiated within the rig generation environment, it is generally not yet associated with a position within a 3-D coordinate system. Each block may include a number of joints, members, and/or controls that may require a position within a 3-D coordinate system of the 3-D computing environment in which the final animation rig will be manipulated. These coordinate requirements may be advertised by the signposts of a block FIG. 12 illustrates an interface 1200 for assigning coordinates to signposts, according to some embodiments. The rig generation environment may provide a window 1202 that allows a user to easily assign coordinate values to advertised signposts 1204. In this example, window 1202 has been instantiated for the block representing an arm. At least seven different signposts may be advertised for the arm element. Joints such as a StarUNT, a MiddleJNT, and an EndJNT may correspond to 3-D coordinates of a shoulder, elbow, and wrist of the arm. Controls such as PlaneNormal and PoleVector may correspond to coordinates of controls for the arm plane and the wrist vector of the arm. Other signposts may also be advertised by the arm.

In order to simplify the process of assigning coordinates to signposts, a number of different options are made available by the rig generation environment. In a first option, a user may select a coordinate in the 3-D computing environment, and assign 1210 a coordinate to a specific signpost. For example, a user could click a first coordinate in the 3-D computing environment and assign it to the EndJNT of the arm, click on a second coordinate in the 3-D computing environment and assign it to the MiddleJNT of the arm, and so forth.

In a second option, a user may generate a new coordinate within the rig generation environment using a "New" control 1208. The new coordinate may be generated automatically by the rig generation environment. In some embodiments, the new coordinate may be a default coordinate that corresponds to a preassigned position for the arm. Thus, clicking on the "New" control for each signpost would generate an arm positioned in the 3-D coordinate system in a predefined position. In some embodiments, the new coordinate may be assigned an origin of the 3-D coordinate system for each signpost. The user could then edit the coordinate position, scale, and/or rotation within the rig generation environment.

In a third option, a user may assign a template to the arm block. A template may include all the signposts of the arm and a value associated with each. For example, a template could represent an arm in a standing relaxed position. Assigning this template to the arm block would automatically assign 3-D coordinates to each of the block signposts such that the arm was in the position defined by the template. Thus, multiple templates may be available for a single block. Similarly, templates may be used across multiple blocks. For example, a single template may be used by both an arm block and a leg block. An arm block may use templates associated with a relaxed arm, a bent arm, and arm on a character's hip, an arm positioned to fire a weapon, and/or the like.

Using templates to assign signpost values simplifies the process of instantiating a block by eliminating the need for a user to input or provide individual 3-D coordinates. Instead, a user can instantiate an arm block, and select the signpost template associated with the desired pose and location. Templates also allow users to resize blocks to fit different coordinate systems. Different divisions within an animation studio may use animation rigs that have very different scales. In one known example, one division used rigs that were 100 times the size of the rigs used by another division. By using templates, rigs can be sized very quickly such that blocks can be reused across divisions. Character generation may also be authored using different facing axes. Templates allow for re-orientation of rigs along different facing axes, further allowing reuse.

Figure 13:
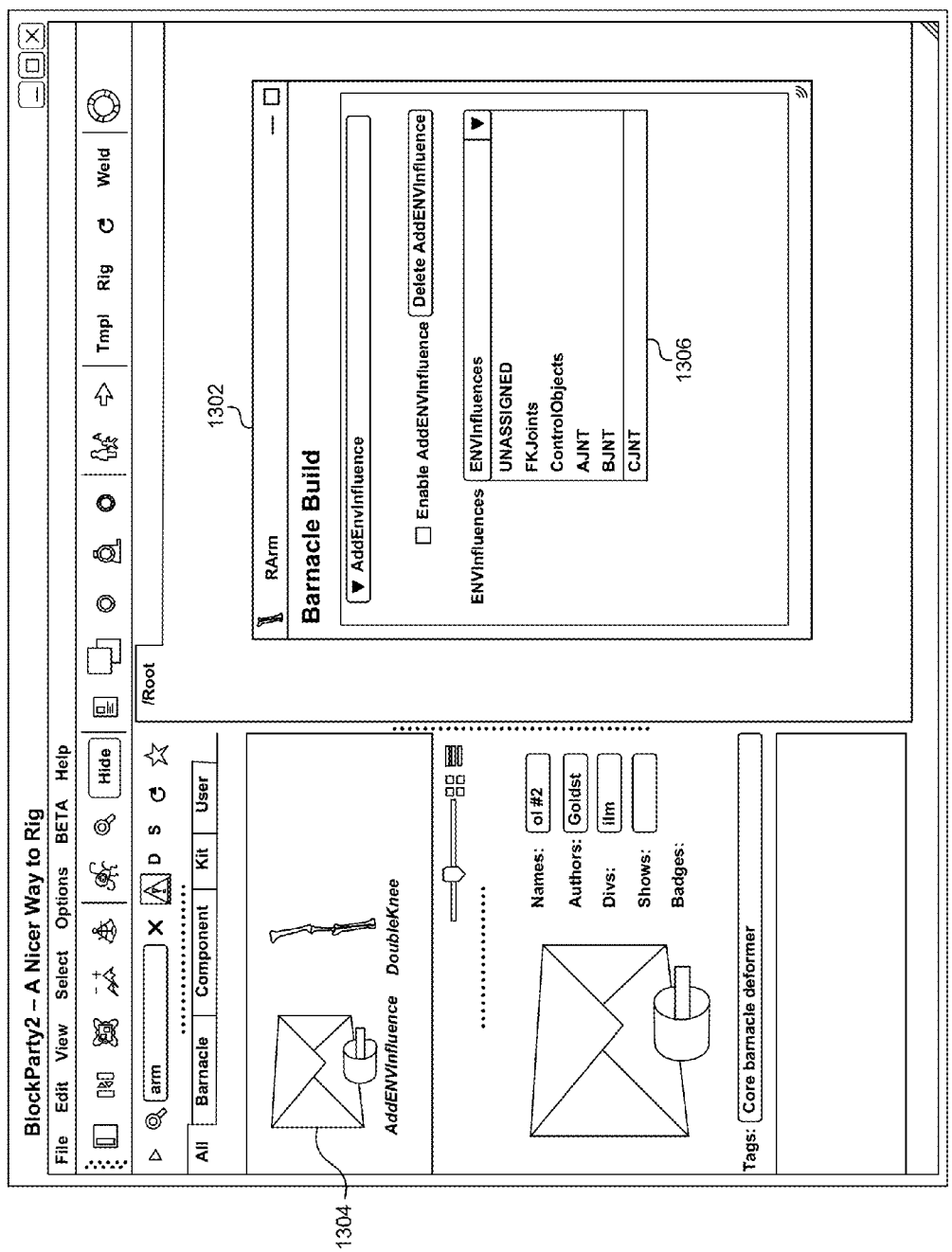
FIG. 13 illustrates an interface for assigning barnacles, according to some embodiments.

FIG. 13 illustrates an interface 1300 for assigning barnacles, according to some embodiments. In addition to attributes, signposts, and ports, barnacles can be used to create relationships between a rig element and a 3-D mesh and/or to alter the structure or behavior of a rig element. Interface 1300 illustrates a window 1302 used to assign a barnacle to an arm block to connect the arm block to a 3-D mesh. Instead of moving individual vertices or polygons in a mesh, animators can instead manipulate controls or joints on a structural rig. Relationships can be established between points on the rig and points on the mesh that allow the movement of the rig to generate fluid and predictable movements in the mesh. Barnacles can be reused to establish this relationship.

Window 1302 may be used to add a barnacle to the arm block. This particular barnacle is entitled AddENVInfluence, and may generally be assigned to enveloping or skinning influence variables within the arm block. To add the barnacle, a user may select the AddENVInfluence icon 1304 from the library and drag-and-drop it into an existing block. Window 1302 may allow the user to assign the AddENVInfluence to a specific point in the arm, such as the AJNT, BJNT, or CJNT, each of which corresponds to joints in the arm. These points may then be connected automatically to the mesh in the 3-D scene.

Figure 14:
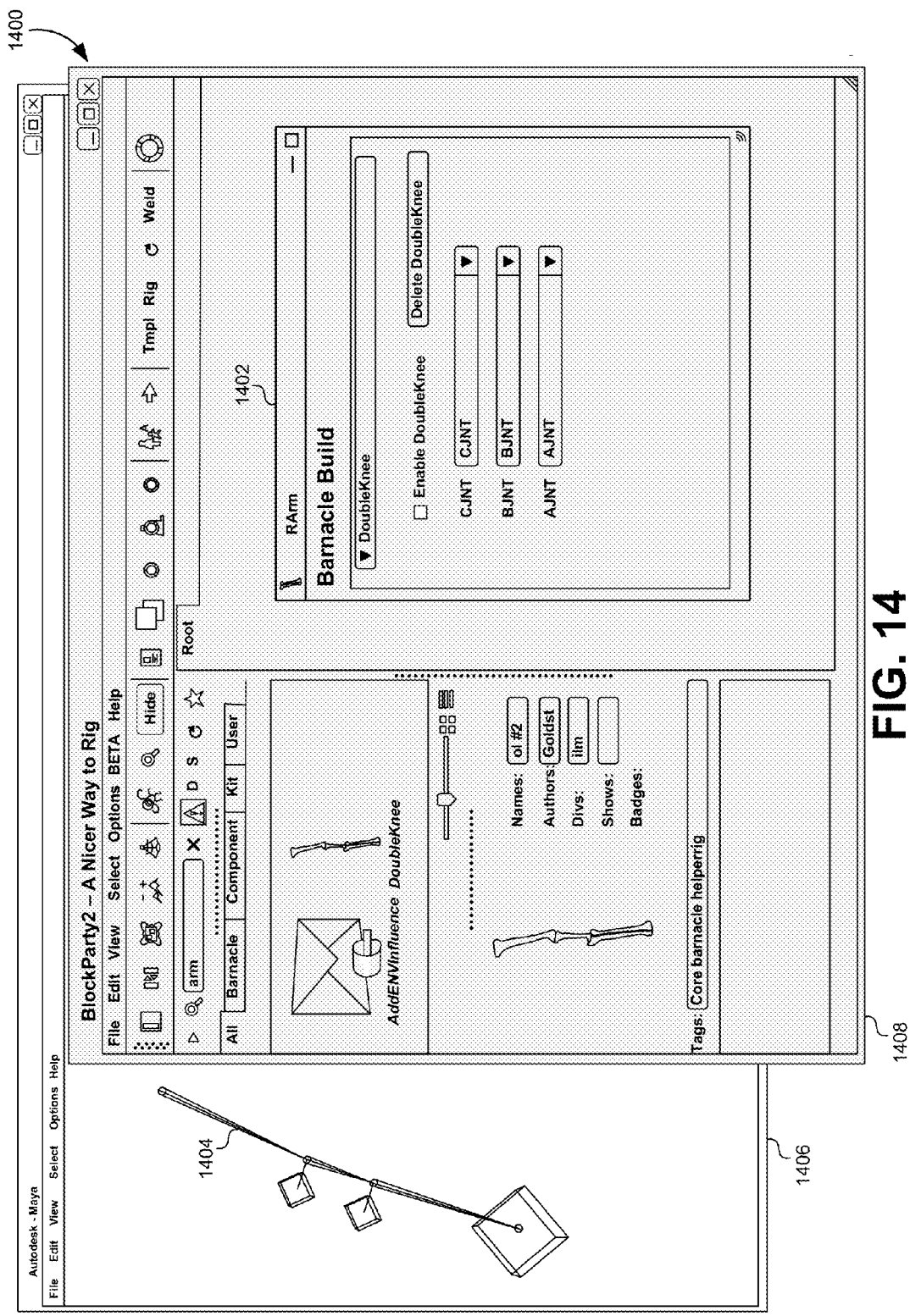
FIG. 14 illustrates a display for adding a barnacle that changes the structure of a block, according to some embodiments.

FIG. 14 illustrates a display 1400 for adding a barnacle that changes the structure of a block, according to some embodiments. Here, a "DoubleKnee" barnacle may be used to alter the structure of a rig element representing a limb. Specifically, this barnacle may add an additional joint to the rig element. Using this type of barnacle, a user may repurpose an existing block for uses that were not considered by the original block designer. For example, a human leg may be repurposed to add an additional joint and function as an animal leg. In this example, the double knee Barnacle may be added to an arm to add an extra joint at the elbow of the arm.

Certain internal variables may be exposed as handles that may be accepted by the barnacle. In this case, the handles are labeled as the AJNT, BJNT, and CJNT, and correspond to joints in the arm. These handles may be assigned to hooks in the DoubleKnee barnacle using window 1402. In this way, the hook and corresponding handle form the contract between the block and the barnacle. Internally, block attributes are used as inputs for the code that builds the rig in the 3-D environment. The DoubleKnee barnacle adds additional joints to the structure of the arm and adds a control to the 3-D rig.

Note that display 1400 illustrates both the 3-D computing environment 1406 and the rig generation environment 1408 operating simultaneously. As the double knee Barnacle is added to the arm, the rig 1404 in the 3-D computing environment 1406 shows the additional joint and control added to the arm. Thus, a user can add a DoubleKnee barnacle to the arm, experiment with its functionality in the 3-D computing environment 1406, and determine whether it should be made a lasting part of the animation rig.

Similar to the friend connections that are used to connect plug and socket ports, a similar mechanism may be used to automatically assign hooks in a barnacle to handles in a block. The rig generation environment may use the names given to hooks to match the names given to handles. Therefore, a standardized naming convention may be used such that joints in appendages, for example, may be universally used with barnacles that add to and/or alter these joints. The rig generation environment may automatically populate the fields of window 1402 with similarly named hooks for each handle. This may allow a user to simply assign a barnacle, and accept the default hook/handle connections presented by window 1402 without needing to explore other handles exposed by the block.

Figure 15:
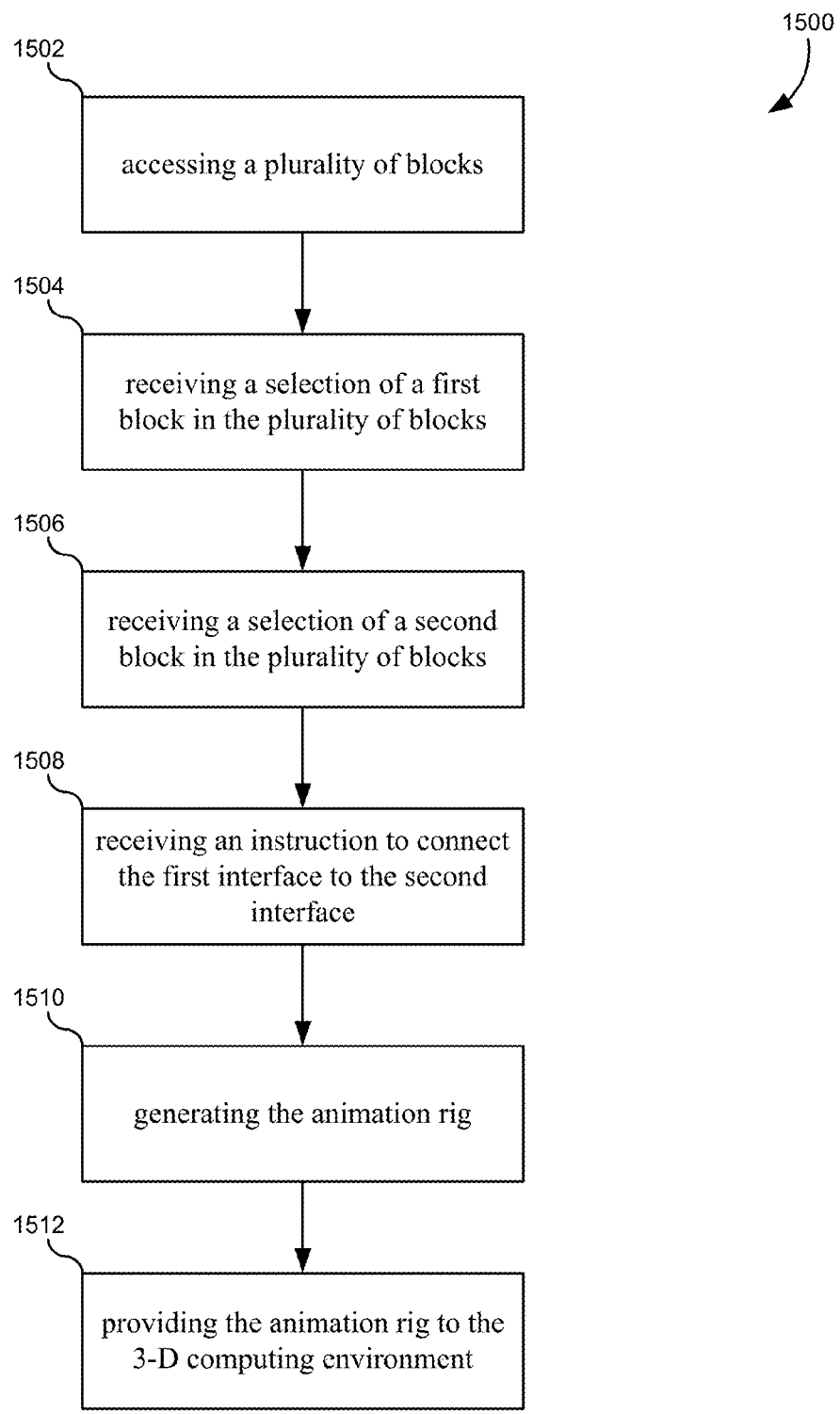
FIG. 15 illustrates a flowchart for a method of generating an animation rig for a 3-D computing environment, according to some embodiments.

FIG. 15 illustrates a flowchart 1500 for a method of generating an animation rig for a 3-D computing environment, according to some embodiments. This method may address the underlying process of generating a rig from blocks using contractual obligations that are advertised by the blocks. These contractual obligations may also be referred to as interfaces that govern interactions with other rig elements in the 3-D computing environment. As described above, these contractual obligations, or interfaces, may include position signposts, ports (including plugs and sockets), attributes, and/or handles corresponding to barnacle hooks. Generally, users may select blocks, provide connections or values defined by the contractual interfaces, and generate a 3-D rig therefrom.

The method may include accessing a plurality of blocks (1502). The plurality of blocks may be presented in a simplified rig generation environment. The plurality of blocks may be part of a library of blocks. Each of the plurality of blocks may represent a particular rig element, such as an arm, a leg, a wheel, a collarbone, a firearm, and/or the like. Each of the plurality of blocks may include one or more interfaces that govern interactions with other rigged elements in the 3-D computing environment. Again, these interfaces may include ports or handles that form contractual obligations with other blocks or barnacles, respectively. These interfaces may also include position signposts and attributes for which values may be defined or coordinates may be assigned. Each of the plurality of blocks may also include information for generating a portion of the animation rig corresponding to the particular rig element represented by the block. This information may include actual code, or may include values used as inputs by a rig generation engine to automatically generate a rig element.

The method may also include receiving a selection of a first block in the plurality of blocks (1504). Among other things, the first block may include a first interface and first information. The first block may represent a first rig element. The first information may be used to generate a portion of the animation rig corresponding to the first rig element. The rig element may be a building-block piece of a larger rig, such as an arm, a leg, a foot, and/or the like. The first block may be selected graphically from a library of blocks within a rig generation environment.

The method may also include receiving a selection of a second block in the plurality of blocks (1506). Among other things, the second block may include a second interface and second information. The second block may represent a second rig element. The second information may be used to generate a portion of the animation rig corresponding to the second rig element. The second rig element may be a building-block piece of a larger rig, such as an arm, a leg, a foot, and/or the like. The second block may be selected graphically from a library of blocks within a rig generation environment. In some cases, the first block may be distinct from the second block such that they represent different rig elements. In other cases, the first block and the second block may be different instances of the same block representing the same rig element.

The method may additionally include receiving an instruction to connect the first interface to the second interface (1508). The connection between the first interface and the second interface may be configured such that manipulating the first rig element affects the second rig element in the 3-D computing environment. This connection may be represented as a plug/socket connection forming a parent-child relationship as described above in this disclosure. In some cases, the connection may be made or suggested automatically by automatically determining that the first interface is likely to be connected to the second interface, and providing one or more visual indications that relate the first interface to the second interface in order to suggest a preferred, or "friend," connection between the first interface and the second interface. The connection may be made by a user in response to the visual indication, or the connection may be made automatically.

The method may further include generating an animation rig using the first information and the second information (1510). In some embodiments, the rig generation environment may submit the information—which may describe the first block, the second block, and the connection between these blocks—as inputs to a rig generation engine. The animation rig may be generated in a form that is exportable to a 3-D computing environment. The animation rig may include the first rig element and the second rig element, along with other rig elements from other blocks. The method may include providing the animation rig to the 3-D computing environment (1512).

In some embodiments, the one or more interfaces may include one or more position signposts. Each of the one or more position signposts may be assigned a value corresponding to a coordinate within the 3-D computing environment that affects the placement of the corresponding rig element within the 3-D computing environment. In these embodiments, the method may further include accessing a plurality of templates. Each template may include one or more predetermined coordinates corresponding to signpost values. The method may also include receiving a selection of a first template wherein the one or more predetermined coordinates of the first template correspond to one or more signposts of the first block. For example, if the first block represents an arm, the first template may assign coordinates to each signpost specifying a particular position for the arm in a 3-D scene. The method may further include assigning the first template to the first block such that generating the animation rig further uses the one or more predetermined values of the first template to position at least part of the animation rig in the 3-D computing environment.

In some embodiments, the one or more interfaces may include one or more handles that expose parameters of each block. In these embodiments, the method may also include receiving a selection of a barnacle comprising one or more hooks. The barnacle may be configured to modify the behavior or structure of each block by accessing the parameters exposed by the handles of the blocks. Similarly, the one or more interfaces may also include a plurality of attributes, each of which may be assigned a value that is descriptive of the block or rig element.

Figure 16:
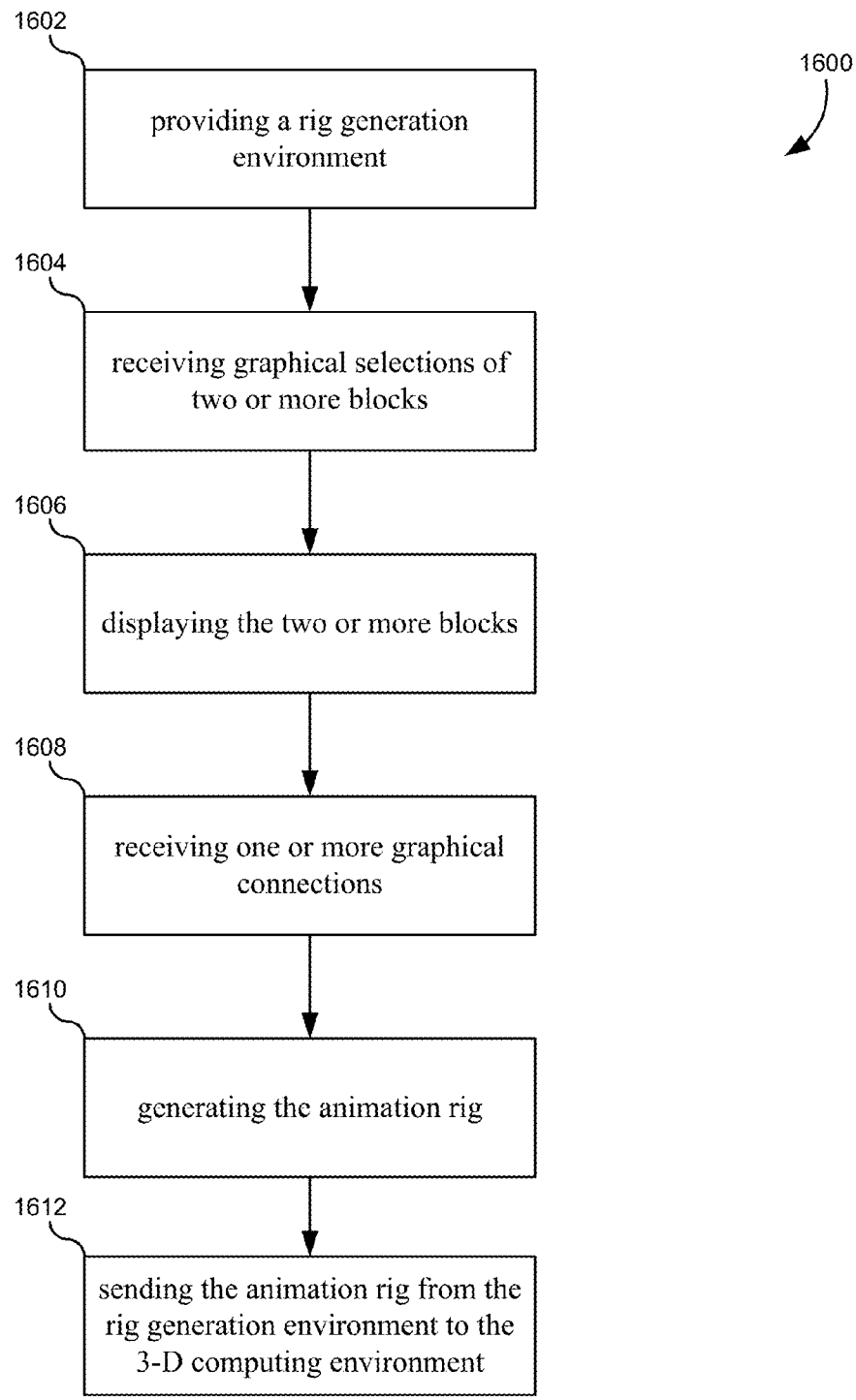
FIG. 16 illustrates a flowchart for a method of generating an animation rig for a 3-D computing environment, according to some embodiments.

FIG. 16 illustrates a flowchart 1600 of a method of generating an animation rig for 3-D computing environment. As opposed to flowchart 1500, flowchart 1600 may be directed towards the simplify computing environment, or rig generation interface, described herein that simplifies the process of designing an animation rig. Users may graphically select blocks represented by icons that are descriptive of the represented rig elements. Users may provide graphical connections between interfaces, such as ports, in order to link blocks together both structurally and behaviorally. This simplified interface may then generate and export the animation rig to a more complex 3-D computing environment.

The method may include providing a rig generation environment (1602). The rig generation environment may operate separately from the 3-D computing environment. For example, the 3-D computing environment may comprise a commercially available graphics product, such as Autodesk® Maya. The rig generation environment may operate as a plug-in to the 3-D computing environment. The rig generation environment may also operate as a separate piece of software that provides exportable data that can be interpreted by the 3-D computing environment as information representing an animation rig. The rig generation environment may be designed and distributed by an entity that is separate from an entity that designs and distributes the 3-D computing environment.

In some embodiments, the rig generation environment may include a library storing a plurality of blocks. As described above, each of the plurality of blocks may represent a particular rig element. Additionally, each of the plurality of blocks may also include information for generating the rig element in the 3-D computing environment. Each of the plurality of blocks may also include a first icon that is visually representative of the particular rig element. For example, a block representing an arm may include a first icon that visually depicts a skeletal arm. The first icon could also depict variations of the skeletal arm, such as a robotic arm, a monster arm, a damaged arm, and/or the like.

The first icon may be part of a visual block object that abstracts away the underlying complexity of the rig element. The visual block object may be configured such that users can drag and drop the block in a workspace of the rig generation environment. In some embodiments, the visual block object may include only information that is needed to represent the block visually to a user, including connection ports for connecting two or more blocks. Ports may be represented with second icons that may be configured to accept graphical connections between blocks that represent a physical or behavioral relationship between the underlying rig elements. In some embodiments, the rig generation environment may be a two-dimensional (2-D) interface. In this case, blocks may also be represented two-dimensionally so as to simplify the placement and connection process.

The method may also include receiving graphical selections of two or more blocks (1604). Blocks may be selected from a library area of the rig generation environment and instantiated in a workspace of the rig generation environment. After receiving the selections of the two or more blocks, the method may additionally include displaying the two or more blocks in the rig generation environment (1606).

The method may further include receiving one or more graphical connections (1608). Graphical connections may connect one block to another block. Multiple graphical connections may exist between blocks within the two or more blocks. For example, a hand may be connected to an arm, which may be connected to a collarbone, which may be connected to a spine, all of which are represented by separate blocks. Connections may be made by using an input device and drawing a connection between ports on separate blocks.

The method may also include generating the animation rig (1610). The animation rig may be generated using the information for each of the two or more blocks instantiated in the workspace. The animation rig may be composed of rig elements represented by each of the two or more blocks. The rig elements may be interconnected according to the one or more graphical connections. In other words, graphical connections made in the rig generation environment may correspond to physical or behavioral connections between rig elements in the 3-D computing environment.

The method may additionally include sending the animation rig from the rig generation environment to the 3-D computing environment 1612. Sending the animation rig may comprise sending a data structure to the 3-D computing environment that may be interpreted as representing the animation rig. The internal representation of the animation rig may differ between the rig generation environment and the 3-D computing environment. In some embodiments, the animation rig may automatically be sent to the 3-D computing environment as changes are made so as to provide a real-time representation of the animation rig as it is designed in the rig generation environment.

It should be appreciated that the specific steps illustrated in FIGS. 15-16 provide particular methods of generating 3-D rigs according to various embodiments of the present invention. Other sequences of steps may also be performed according to alternative embodiments. For example, alternative embodiments of the present invention may perform the steps outlined above in a different order. Moreover, the individual steps illustrated in FIGS. 15-16 may include multiple sub-steps that may be performed in various sequences as appropriate to the individual step. Furthermore, additional steps may be added or removed depending on the particular applications. One of ordinary skill in the art would recognize many variations, modifications, and alternatives.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 17:
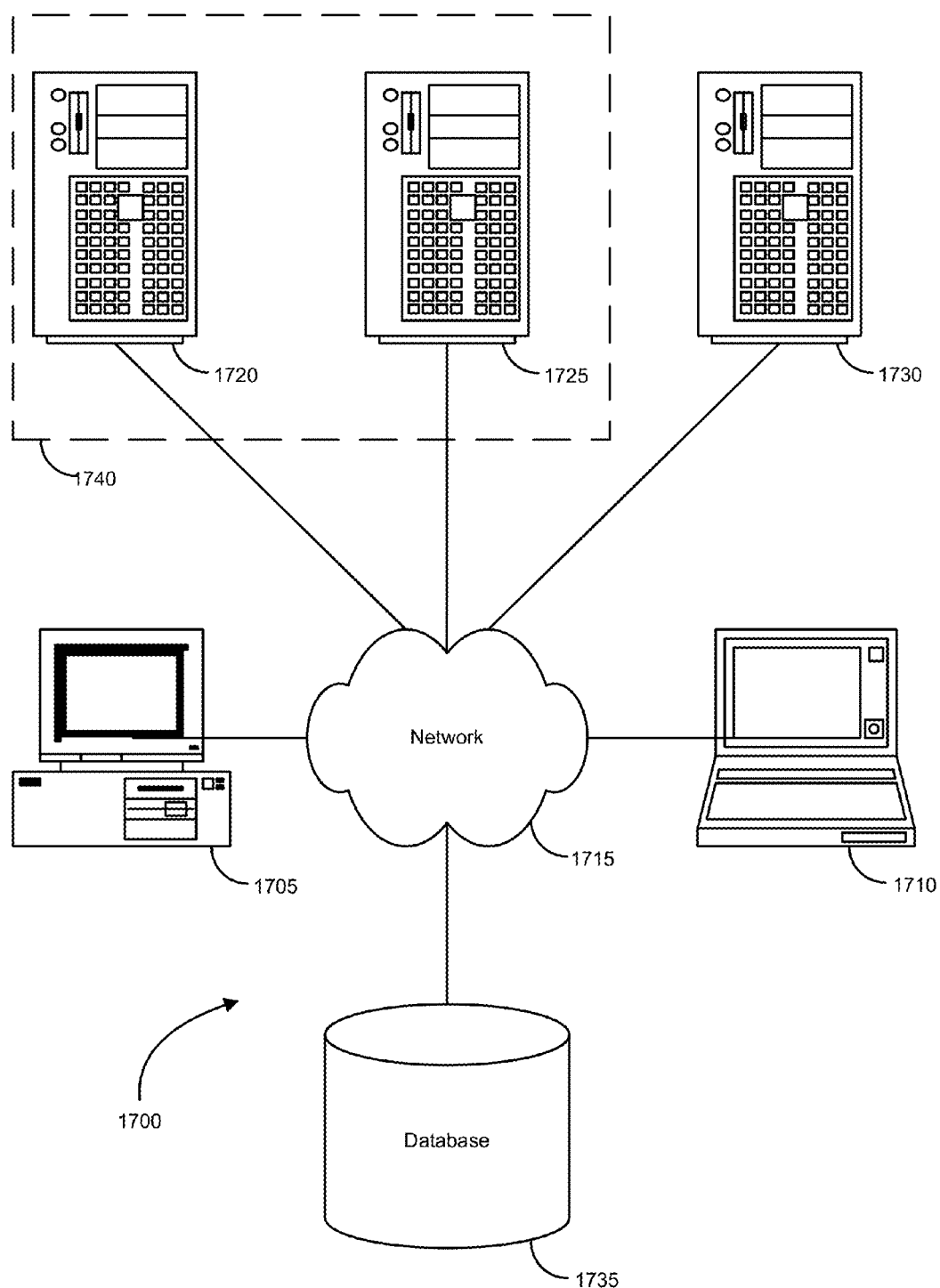
FIG. 17 illustrates a block diagram of components of an exemplary operating environment in which various embodiments of the present invention may be implemented.

Each of the embodiments disclosed herein may be implemented in a special-purpose computer graphics system. Alternatively, embodiments may also be implemented in a general-purpose computer system. FIG. 17 is a block diagram illustrating components of an exemplary operating environment in which various embodiments of the present invention may be implemented. The system 1700 can include one or more user computers 1705, 1710, which may be used to operate a client, whether a dedicated application, web browser, etc. The user computers 1705, 1710 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 1705, 1710 may also have any of a variety of applications, including one or more development systems, database client and/or server applications, and web browser applications. Alternatively, the user computers 1705, 1710 may be any other electronic device, such as a thin-client computer, Internet-enabled mobile telephone, and/or personal digital assistant, capable of communicating via a network (e.g., the network 1715 described below) and/or displaying and navigating web pages or other types of electronic documents. Although the exemplary system 1700 is shown with two user computers, any number of user computers may be supported.

In some embodiments, the system 1700 may also include a network 1715. The network may can be any type of network familiar to those skilled in the art that can support data communications using any of a variety of commercially-available protocols, including without limitation TCP/IP, SNA, IPX, AppleTalk, and the like. Merely by way of example, the network 1715 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 1720, 1725, 1730 which can be general purpose computers and/or specialized server computers (including, merely by way of example, PC servers, UNIX servers, mid-range servers, mainframe computers rack-mounted servers, etc.). One or more of the servers (e.g., 1730) may be dedicated to running applications, such as a business application, a web server, application server, etc. Such servers may be used to process requests from user computers 1705, 1710. The applications can also include any number of applications for controlling access to resources of the servers 1720, 1725, 1730.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1705, 1710. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1705, 1710.

In some embodiments, an application server may create web pages dynamically for displaying on an end-user (client) system. The web pages created by the web application server may be forwarded to a user computer 1705 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1700 may also include one or more databases 1735. The database(s) 1735 may reside in a variety of locations. By way of example, a database 1735 may reside on a storage medium local to (and/or resident in) one or more of the computers 1705, 1710, 1715, 1725, 1730. Alternatively, it may be remote from any or all of the computers 1705, 1710, 1715, 1725, 1730, and/or in communication (e.g., via the network 1720) with one or more of these. In a particular set of embodiments, the database 1735 may reside in a storage-area network ("SAN") familiar to those skilled in the art. Similarly, any necessary files for performing the functions attributed to the computers 1705, 1710, 1715, 1725, 1730 may be stored locally on the respective computer and/or remotely, as appropriate. In one set of embodiments, the database 1735 may be a relational database that is adapted to store, update, and retrieve data in response to SQL-formatted commands.

Figure 18:
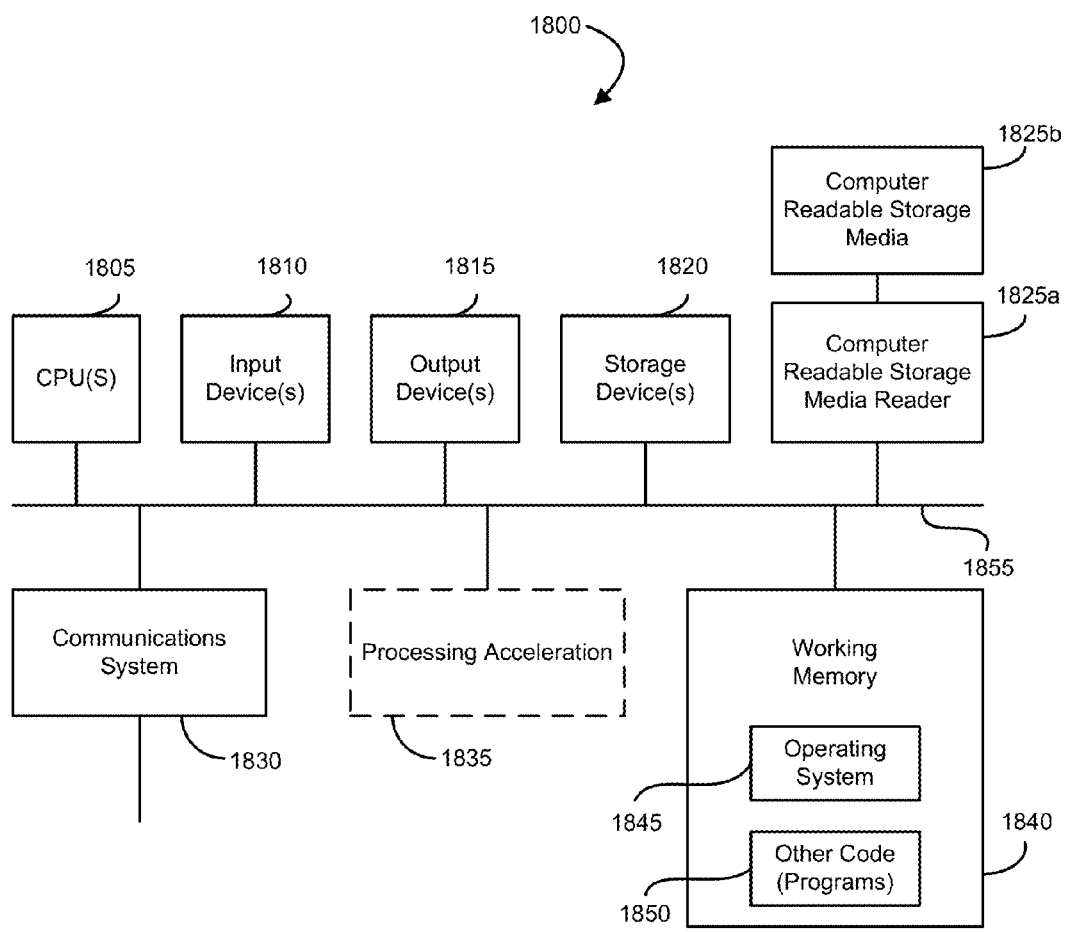
FIG. 18 illustrates a block diagram of an exemplary computer system in which embodiments of the present invention may be implemented.

FIG. 18 illustrates an exemplary computer system 1800, in which various embodiments of the present invention may be implemented. The system 1800 may be used to implement any of the computer systems described above. The computer system 1800 is shown comprising hardware elements that may be electrically coupled via a bus 1855. The hardware elements may include one or more central processing units (CPUs) 1805, one or more input devices 1810 (e.g., a mouse, a keyboard, etc.), and one or more output devices 1815 (e.g., a display device, a printer, etc.). The computer system 1800 may also include one or more storage device 1820. By way of example, storage device(s) 1820 may be disk drives, optical storage devices, solid-state storage device such as a random access memory ("RAM") and/or a read-only memory ("ROM"), which can be programmable, flash-updateable and/or the like.

The computer system 1800 may additionally include a computer-readable storage media reader 1825a, a communications system 1830 (e.g., a modem, a network card (wireless or wired), an infra-red communication device, etc.), and working memory 1840, which may include RAM and ROM devices as described above. In some embodiments, the computer system 1800 may also include a processing acceleration unit 1835, which can include a DSP, a special-purpose processor and/or the like.

The computer-readable storage media reader 1825a can further be connected to a computer-readable storage medium 1825b, together (and, optionally, in combination with storage device(s) 1820) comprehensively representing remote, local, fixed, and/or removable storage devices plus storage media for temporarily and/or more permanently containing computer-readable information. The communications system 1830 may permit data to be exchanged with the network 1820 and/or any other computer described above with respect to the system 1800.

The computer system 1800 may also comprise software elements, shown as being currently located within a working memory 1840, including an operating system 1845 and/or other code 1850, such as an application program (which may be a client application, web browser, mid-tier application, RDBMS, etc.). It should be appreciated that alternate embodiments of a computer system 1800 may have numerous variations from that described above. For example, customized hardware might also be used and/or particular elements might be implemented in hardware, software (including portable software, such as applets), or both. Further, connection to other computing devices such as network input/output devices may be employed. Software of computer system 1800 may include code 1850 for implementing embodiments of the present invention as described herein.

Each of the methods described herein may be implemented by a computer system, such as computer system 1800 in FIG. 18. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating an animation rig for a three-dimensional (3-D) computing environment, the method comprising:
    accessing a plurality of blocks, wherein:
        each of the plurality of blocks represents a particular rig element; and
        each of the plurality of blocks comprises:
            one or more interfaces that govern interactions with other rig elements in the 3-D computing environment; and
            information for generating a portion of the animation rig corresponding to the particular rig element represented by the block;
    receiving a selection of a first block in the plurality of blocks, the first block comprising a first interface and first information, the first block representing a first rig element, wherein the first interface comprises one or more position signposts that can be assigned a value corresponding to a coordinate within the 3-D computing environment that affects the placement of the first rig element within the 3-D computing environment;
    receiving a selection of a second block in the plurality of blocks, the second block comprising a second interface and second information, the second block representing a second rig element;
    receiving an instruction to connect the first interface to the second interface, such that manipulating the first rig element affects the second rig element in the 3-D computing environment;
    receiving a selection of a first template comprising one or more predetermined coordinates in the 3-D computing environment that correspond to the one or more position signposts of the first block;
    generating the animation rig using the first information, the second information, and the one or more predetermined coordinates to position at least a part of the animation rig in the 3-D computing environment; and
    providing the animation rig to the 3-D computing environment.

2. The method of claim 1 wherein the first interface and the second interface are connected in a parent-child relationship, wherein manipulating the second rig element does not affect the first rig element in the 3-D computing environment.

3. The method of claim 1 wherein the one or more interfaces comprises one or more position signposts, wherein each of the one or more position signposts can be assigned a value corresponding to a coordinate within the 3-D computing environment that affects the placement of the corresponding rig element within the 3-D computing environment.

4. The method of claim 1 further comprising:
    automatically determining that the first interface is likely to be connected to the second interface; and
    providing one or more indications that relate the first interface to the second interface suggesting a preferred connection between the first interface and the second interface.

5. The method of claim 1 wherein the one or more interfaces comprises one or more handles that expose parameters of each block.

6. The method of claim 5 further comprising:
    receiving a selection of a barnacle comprising one or more hooks, wherein the barnacle is configured to modify a behavior or a structure of a block by accessing the parameters exposed by the handles of the block using the one or more hooks; and
    receiving an instruction to connect at least one of the one or more handles of the first block to the one or more hooks of the barnacle, wherein:
        the behavior or the structure of the animation rig is generated according to the barnacle.

7. The method of claim 1 wherein the first block and the second block are connected in a rig design environment that is distinct from the 3-D computing environment.

8. The method of claim 1 wherein:
    the first block represents a first skeletal element of a humanoid frame; and
    the second block represents a second skeletal element of the humanoid frame, wherein the first skeletal element is physically connected to the second skeletal element in the animation rig.

9. The method of claim 1 wherein the one or more interfaces comprises one or more attributes, wherein each of the one or more attributes may be assigned a value that is descriptive of the block or rig element.

10. A non-transitory computer-readable memory comprising a sequence of instructions which, when executed by one or more processors, causes the one or more processors to generate an animation rig for a three-dimensional (3-D) computing environment by:
    accessing a plurality of blocks, wherein:
        each of the plurality of blocks represents a particular rig element; and
        each of the plurality of blocks comprises:
            one or more interfaces that govern interactions with other rig elements in the 3-D computing environment; and
            information for generating a portion of the animation rig corresponding to the particular rig element represented by the block;
    receiving a selection of a first block in the plurality of blocks, the first block comprising a first interface and first information, the first block representing a first rig element, wherein the first interface comprises one or more handles that expose parameters of the first block;
    receiving a selection of a second block in the plurality of blocks, the second block comprising a second interface and second information, the second block representing a second rig element;

receiving an instruction to connect the first interface to the second interface, such that manipulating the first rig element affects the second rig element in the 3-D computing environment;

receiving a selection of a barnacle comprising one or more hooks, wherein the barnacle is configured to modify a behavior or a structure of a block by accessing the parameters exposed by the handles of the block using the one or more hooks;

receiving an instruction to connect at least one of the one or more handles of the first block to the one or more hooks of the barnacle;

generating the animation rig using the first information and the second information, wherein a behavior or a structure of the animation rig is generated according to the barnacle; and providing the animation rig to the 3-D computing environment.

11. The non-transitory computer-readable memory according to claim 10 wherein the first interface and the second interface are connected in a parent-child relationship, wherein manipulating the second rig element does not affect the first rig element in the 3-D computing environment.

12. The non-transitory computer-readable memory according to claim 10 wherein the one or more interfaces comprises one or more position signposts, wherein each of the one or more position signposts can be assigned a value corresponding to a coordinate within the 3-D computing environment that affects the placement of the corresponding rig element within the 3-D computing environment.

13. The non-transitory computer-readable memory according to claim 10 wherein the instructions further cause the one or more processors to generate the animation rig for the 3-D computing environment by:

accessing a plurality of templates, wherein each template includes one or more predetermined coordinates in the 3-D computing environment;

receiving a selection of a first template, wherein the one or more predetermined coordinates of the first template correspond to the one or more position signposts of the first block; and assigning the first template to the first block, wherein:
generating the animation rig further uses the one or more predetermined coordinates of the first template to position at least a part of the animation rig in the 3-D computing environment.

14. The non-transitory computer-readable memory according to claim 10 wherein the instructions further cause the one or more processors to generate the animation rig for the 3-D computing environment by:

automatically determining that the first interface is likely to be connected to the second interface; and providing one or more indications that relate the first interface to the second interface suggesting a preferred connection between the first interface and the second interface.

15. The non-transitory computer-readable memory according to claim 10 wherein the first block and the second block are connected in a rig design environment that is distinct from the 3-D computing environment.

16. A system comprising:
one or more processors; and
a memory communicatively coupled with and readable by the one or more processors and comprising a sequence of instructions which, when executed by the one or more processors, cause the one or more processors to generate an animation rig for a three-dimensional (3-D) computing environment by:
accessing a plurality of blocks, wherein:
each of the plurality of blocks represents a particular rig element; and
each of the plurality of blocks comprises:
one or more interfaces that govern interactions with other rig elements in the 3-D computing environment; and
information for generating a portion of the animation rig corresponding to the particular rig element represented by the block;
receiving a selection of a first block in the plurality of blocks, the first block comprising a first interface and first information, the first block representing a first rig element, wherein the first interface comprises one or more position signposts that can be assigned a value corresponding to a coordinate within the 3-D computing environment that affects the placement of the first rig element within the 3-D computing environment;
receiving a selection of a second block in the plurality of blocks, the second block comprising a second interface and second information, the second block representing a second rig element;
receiving an instruction to connect the first interface to the second interface, such that manipulating the first rig element affects the second rig element in the 3-D computing environment;
receiving a selection of a first template comprising one or more predetermined coordinates in the 3-D computing environment that correspond to the one or more position signposts of the first block;
generating the animation rig using the first information the second information, and the one or more predetermined coordinates to position at least a part of the animation rig in the 3-D computing environment; and
providing the animation rig to the 3-D computing environment.

17. The system of claim 16 wherein the first block and the second block are connected in a rig design environment that is distinct from the 3-D computing environment.

18. The system of claim 16 wherein:
the first block represents a first skeletal element of a humanoid frame; and
the second block represents a second skeletal element of the humanoid frame, wherein the first skeletal element is physically connected to the second skeletal element in the animation rig.

19. The system of claim 16 wherein the first interface and the second interface are connected in a parent-child relationship, wherein manipulating the second rig element does not affect the first rig element in the 3-D computing environment.

20. The system of claim 16 wherein the memory further comprises additional instructions which, when executed by the one or more processors, cause the one or more processors to further generate an animation rig for a 3-D computing environment by:
automatically determining that the first interface is likely to be connected to the second interface; and
providing one or more indications that relate the first interface to the second interface suggesting a preferred connection between the first interface and the second interface.

* * * * *

UNITED STATES PATENT AND TRADEMARK OFFICE
CERTIFICATE OF CORRECTION

| | | |
|---|---|---|
| PATENT NO. | : 9,508,178 B2 | Page 1 of 1 |
| APPLICATION NO. | : 13/946823 | |
| DATED | : December 13, 2016 | |
| INVENTOR(S) | : Michael Justin Lee Jutan et al. | |

It is certified that error appears in the above-identified patent and that said Letters Patent is hereby corrected as shown below:

In the Claims

Column 28, Claim 16, Line 33:
Replace "generating the animation rig using the first information" with --generating the animation rig using the first information,--

Signed and Sealed this
Twentieth Day of February, 2018

Andrei Iancu
*Director of the United States Patent and Trademark Office*